US011138420B2

(12) United States Patent
Nishikawa et al.

(10) Patent No.: US 11,138,420 B2
(45) Date of Patent: *Oct. 5, 2021

(54) PEOPLE STREAM ANALYSIS METHOD, PEOPLE STREAM ANALYSIS APPARATUS, AND PEOPLE STREAM ANALYSIS SYSTEM

(71) Applicant: PANASONIC CORPORATION, Osaka (JP)

(72) Inventors: Yuri Nishikawa, Kanagawa (JP); Jun Ozawa, Nara (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,355

(22) Filed: Jul. 6, 2020

(65) Prior Publication Data
US 2020/0334454 A1 Oct. 22, 2020

Related U.S. Application Data

(63) Continuation of application No. 16/026,044, filed on Jul. 3, 2018, now Pat. No. 10,747,991.

(30) Foreign Application Priority Data

Jul. 14, 2017 (JP) .............................. JP2017-138290

(51) Int. Cl.
G06F 9/00 (2006.01)
G06K 9/00 (2006.01)
(Continued)

(52) U.S. Cl.
CPC ..... *G06K 9/00369* (2013.01); *G06K 9/00201* (2013.01); *G06K 9/00778* (2013.01);
(Continued)

(58) Field of Classification Search
CPC .......... G06K 9/00369; G06K 9/00201; G06K 9/00778; G06Q 30/0201; G06T 1/0007; G06T 2207/30196
(Continued)

(56) References Cited

U.S. PATENT DOCUMENTS 10,747,991 B2 * 8/2020 Nishikawa ......... G06K 9/00369
2011/0125327 A1 5/2011 Sankai
(Continued)

FOREIGN PATENT DOCUMENTS

JP 2005-182565 7/2005
JP 2010-055594 3/2010
(Continued)

Primary Examiner — Gabriel I Garcia
(74) Attorney, Agent, or Firm — Greenblum & Bernstein, P.L.C.

(57) ABSTRACT

A people stream analysis apparatus includes an image information capturer that captures an external appearance image of a person, a person recognizer that recognizes the person from the external appearance image, a store inferrer that identifies from the external appearance image a possession carried by the person, and infers from the identified possession a store from which the possession has been obtained, a memory that stores, in an associated form, person information indicating the recognized person, store information indicating the inferred store, and time information indicating time at which the external appearance image has been captured, and an arrival store order determiner that determines an order of stores in which the person has visited, based on a change in a time sequence of listing of stores indicated by the store information stored on the memory.

8 Claims, 25 Drawing Sheets

(51) Int. Cl.
 _G06Q 30/02_ (2012.01)
 _G06T 1/00_ (2006.01)
(52) U.S. Cl.
 CPC ....... _G06Q 30/0201_ (2013.01); _G06T 1/0007_ (2013.01); _G06T 2207/30196_ (2013.01)
(58) Field of Classification Search
 USPC ........................................................ 382/103
 See application file for complete search history.

(56) References Cited

U.S. PATENT DOCUMENTS

| | | |
|---|---|---|
| 2012/0239504 A1 | 9/2012 | Curlander |
| 2014/0279039 A1* | 9/2014 | Systrom ............. G06Q 30/0224 705/14.66 |
| 2016/0042245 A1 | 2/2016 | Ishiyama |
| 2017/0061250 A1 | 3/2017 | Gao |
| 2017/0099295 A1 | 4/2017 | Ricci |
| 2017/0206437 A1 | 7/2017 | Hachiya |
| 2018/0218351 A1* | 8/2018 | Chaubard .............. H04N 7/181 |

FOREIGN PATENT DOCUMENTS

| | | |
|---|---|---|
| JP | 2011-129093 | 6/2011 |
| JP | 2016-177539 | 10/2016 |
| WO | 2010/013572 | 2/2010 |

\* cited by examiner

FIG. 6

| TIME | IMAGE FILE NAME |
|---|---|
| 13:10 | FA246.png |
| 14:15 | FA247.png |
| 14:38 | FA248.png |
| ⋮ | ⋮ |

FIG. 7

| PERSON ID | IMAGE FILE LIST OF LABELED PERSONS |
|---|---|
| P123 | FA111.png, FA112.png,··· |
| P130 | FA250.png, FA251.png, FA252.png, ··· |
| ⋮ | ⋮ |

FIG. 8

| STORE ID | IMAGE FILE LIST OF LABELED POSSESSIONS |
|---|---|
| SH234 | B777.png, B778.png, ⋯ |
| SH567 | B888.png, B889.png, ⋯ |
| SH789 | B998.png, B999.png |
| ⋮ | ⋮ |

FIG. 9

| STORE ID | STORE NAME |
|---|---|
| SH234 | STORE A |
| SH567 | STORE B |
| SH789 | STORE C |
| ⋮ | ⋮ |

FIG. 10

| TIME | RECOGNIZED PERSON ID | INFERRED STORE ID LIST | NAME OF NEWLY VISITED STORE |
|---|---|---|---|
| 13:10 | P123 | SH234 | STORE A |
| 14:15 | P123 | SH234, SH567 | STORE B |
| 14:38 | P123 | SH234, SH567, SH789 | STORE C |

FIG. 12

| TIME | RECOGNIZED PERSON ID | INFERRED STORE ID LIST | NAME OF NEWLY VISITED STORE |
|---|---|---|---|
| 13:10 | P123 | SH234 | STORE A |
| 14:15 | P123 | SH234, SH567 | STORE B |
| 14:38 | P123 | SH567, SH789 | STORE C |
| ... | ... | ... | ... |

FIG. 13

| MERGER STORE ID | MERGED STORE ID |
|---|---|
| SH567 | SH234 |
| ⋮ | ⋮ |

FIG. 16

| PERSON GROUP ID | PERSON ID LIST |
|---|---|
| G111 | P123, P124, P125 |
| ⋮ | ⋮ |

FIG. 17

| TIME | RECOGNIZED PERSON GROUP ID | INFERRED STORE ID LIST | NAME OF NEWLY VISITED STORE |
|---|---|---|---|
| 13:10 | G111 | SH234 | STORE A |
| 14:15 | G111 | SH234, SH567 | STORE B |
| 14:38 | G111 | SH234, SH567, SH789 | STORE C |
| ... | ... | ... | ... |

FIG. 28

| PRODUCT | COLOR |
|---|---|
| OUTER | RED |
| TOP | GREEN |
| BOTTOM | YELLOW |
| ⋮ | ⋮ |

FIG. 29

| PRICE | DENSITY |
|---|---|
| ONE CENT – $9 | 10% |
| $10 – $100 | 20% |
| ⋮ | ⋮ |
| $100 OR MORE | 100% |

PEOPLE STREAM ANALYSIS METHOD, PEOPLE STREAM ANALYSIS APPARATUS, AND PEOPLE STREAM ANALYSIS SYSTEM

CROSS REFERENCE TO RELATED APPLICATIONS

The present application is a continuation of U.S. patent application Ser. No. 16/026,044, filed Jul. 3, 2018, which claims the benefit of Japanese Patent Application Number 2017-138290, filed Jul. 14, 2017. The entire disclosure of each of the above-identified applications, including the specification, drawings, and claims, is incorporated herein by reference in its entirety.

BACKGROUND

1. Technical Field

The present disclosure relates to people stream analysis methods, people stream analysis apparatuses, and people stream analysis systems. More specifically, the present disclosure relates to a people stream analysis method that determines an order of arrival of a person at stores, a people stream analysis apparatus performing the people stream analysis method, and a people stream analysis system including the people stream analysis apparatus.

2. Description of the Related Art

A large number of commercial facilities, such as shopping malls with many adjoining stores, have been constructed recently. People enjoy shopping for a variety of products from the stores. Each commercial facility or store may desire to learn a consumption trend of each consumer for sales promotion. To this end, they perform people stream analysis to analyze the stream of people by searching what stores customers visit via which route to purchase products.

Japanese Unexamined Patent Application Publication No. 2010-55594 discloses a flow line management system for people stream analysis. The flow line management system includes a registration database that registers face images, a facial recognition engine that detects a face image from the image captured in multiple imaging areas, and a face authentication engine that checks the face image detected by the facial recognition engine against a face image registered in the registration database. The flow line management system thus calculates and records the flow line of each customer in the images captured in the multiple imaging areas.

Japanese Unexamined Patent Application Publication No. 2016-177539 discloses an information collection system. The information collection system includes an information processing terminal and an information processing system, each connected to an access point of a near field communication having a communication coverage set up in accordance with a section of each store. The information processing terminal includes a store arrival information transmitting unit that transmits store arrival information of a customer in response to acquisition of user identification information from a portable terminal of the customer who has entered the communication area of the access point installed in the store, and a store leaving information transmitting unit that transmits store leaving information of the customer to the information processing system in response to a disconnection of the near field communication that was once established with the portable terminal. The information processing system includes a store arrival information recording unit that records the store arrival information, a store leaving information recording unit that records the store leaving information, and a behavioral history information generating unit that generates behavioral history information, based on the store arrival information and the store leaving information of each customer.

SUMMARY

In one general aspect, the techniques disclosed here feature a people stream analysis method of a people stream analysis apparatus. The people stream analysis method includes capturing an external appearance image of a person, recognizing the person from the external appearance image, identifying possessions carried by the person from the external appearance image, and inferring a store from which the person has obtained the identified possessions, storing, in an associated form on a memory, person information indicating the recognized person, store information indicating the inferred store, and time information indicating time at which the external appearance image is acquired, and determining an order of stores according to which the person has visited, based on a change in a time sequence of listing of stores indicated by the store information stored on the memory.

In accordance with the disclosure, the order of stores visited by the person is determined at a higher accuracy level.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates an example of an image file table generated by an image information acquisition unit of FIG. 4;

FIG. 7 illustrates an example of a person recognition table used by a person recognition unit of FIG. 4;

FIG. 8 illustrates an example of a store inference table used by a store inference unit of FIG. 4;

FIG. 9 illustrates an example of a store table used by an arrival store order determination unit of FIG. 4;

FIG. 10 illustrates an example of an arrival store order estimation table stored on a database of FIG. 4;

FIG. 12 illustrates another example of the arrival store order estimation table stored on the database of FIG. 4;

FIG. 13 illustrates an example of a merger store table generated by the arrival store order determination unit of FIG. 4;

FIG. 16 illustrates an example of a person group table generated by a person group recognizing unit of FIG. 15;

FIG. 17 illustrates an example of an arrival store order estimation table stored on a database of FIG. 15;

FIG. 28 illustrates an example of a first color information table that indicates a correspondence relationship between types of products and colors of stickers;

FIG. 29 illustrates an example of a second color information table that indicates the correspondence relationship between prices of products and densities of colors of stickers;

DETAILED DESCRIPTION

Figure 1:
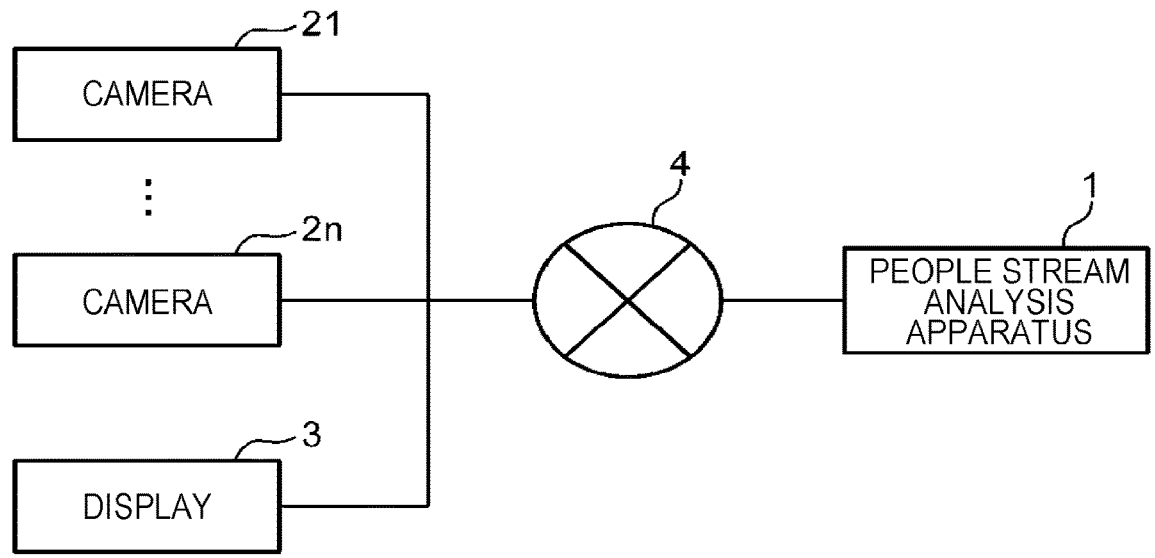
FIG. 1 is a block diagram illustrating a configuration of a people stream analysis system of a first embodiment of the disclosure.

Underlying Knowledge Forming Basis of the Present Disclosure

According to Japanese Unexamined Patent Application Publication No. 2010-55594, monitoring cameras are deployed in multiple imaging areas (such as at a front entrance, a cosmetic department, a household goods department, a women's clothing department, and a service entrance), and captures the images of customers in the imaging areas. In a commercial facility having many adjoining stores, a monitoring camera is to be deployed in each store or department. A large number of cameras are to be deployed, and the line flow management system is complex in configuration.

According to Japanese Unexamined Patent Application Publication No. 2016-177539, the access point set up in a store is used. In a commercial facility having many adjoining stores, an access point is to be deployed in each store or department. A large number of access points are to be set up, and the information collection system is complex in configuration.

According to Japanese Unexamined Patent Application Publication No. 2010-55594, the face image is detected from the captured image, and is checked against a face image stored on the registration database. The flow line of each customer in the images captured in the multiple image areas is calculated and recorded. However, if the face of a customer is not precise enough to be identified, the person is difficult to recognize with the face image alone. The arrival store order of each customer to the stores is difficult to determine.

In the above-described related art techniques, the possessions carried by the person are not studied at all, and there is room for improvement in the analysis of the arrival store order of each person to the stores.

The disclosure provides a people stream analysis method that determines an order of stores visited by a person in a simple configuration at a higher accuracy, a people stream analysis apparatus performing the people stream analysis method, and a people stream analysis system.

The inventors have noticed that a bag supplied from a store (including a plastic bag, and wrapping paper) has typically a store name or brand printed on it when customers purchase products in the store, and after the products are purchased, the customers have the bag as a possession. The order of visits of the person to the stores is learned by recognizing the bag carried by the person, and by determining a difference between the bags and the bags that the same person has immediately earlier. The inventors have concluded that the stores which the person has visited are precisely determined by referencing the possessions of the person.

The inventors have studied how precisely the order of stores in which the customer has visited is determined with a simple configuration. The inventors have noticed the possessions of each person, and have fulfilled the disclosure.

According to one aspect of the disclosure, there is provided a people stream analysis method. The people stream analysis method of a people stream analysis apparatus includes capturing an external appearance image of a person, recognizing the person from the external appearance image, identifying possessions carried by the person from the external appearance image, and inferring a store from which the person has obtained the identified possessions, storing, in an associated form on a memory, person information indicating the recognized person, store information indicating the inferred store, and time information indicating time at which the external appearance image is captured, and determining an order of stores in which the person has visited, based on a change in a time sequence of listing of stores indicated by the store information stored on the memory.

In the configuration described above, the external appearance image of a person is captured, the person is recognized from the captured external appearance view, and the possessions carried by the person are identified from the captured external appearance view. The store from which the identified possessions are obtained is inferred. The memory stores in an associated from the person information indicating the recognized person, the store information indicating the inferred store, and the time information indicating time at which the external appearance image is captured. The order of stores in which the person has visited is determined based on the change in the time sequence of the listing of the stores indicated by the store information stored on the memory.

The possessions are identified from the external appearance image of the person without deploying the camera in each store that is intended to capture the external appearance image. The store from which the possessions are obtained is correctly inferred from the identified possessions. A change in the time sequence of the listing of the inferred stores, for example, a newly added store is determined to be a store the person has visited next. As a result, the order of stores the person has visited is precisely determined in a simple configuration.

The possessions may include a bag.

In the configuration described above, the bag obtained from the store has a logo, a color and a shape unique to the store. The store from which the bag has been obtained is correctly inferred, and the order of stores in which the person has visited is determined at a higher accuracy level.

The bag may have a logo that identifies the store, and the inferring may include inferring the store from which the bag is obtained, based on the logo of the bag.

In the configuration described above, the store from which the bag is obtained is inferred from the logo that identifies the store, and the stores which the person has visited are inferred at a higher accuracy level.

The determining may include calculating a difference between first store list information indicating a list of stores that are inferred based on possessions carried by the person at a first time point and second store list information indicating a list of stores that are inferred based on possessions carried by the person at a second time point later than the first time point, and determining the order of the stores in which the person has visited, based on the difference.

In the configuration described above, the difference between the first store list information indicating the list of stores that are inferred based on the possessions carried by the person at the first time point and the second store list information indicating the list of stores that are inferred based on the possessions carried by the person at the second time point later than the first time point is calculated. The order of the stores in which the person has visited is determined based on the difference. If the calculated difference indicates a newly added store, the newly added store is determined to be a store the person has visited next.

If there is a store that is present in the first store list information but is missing in the second store list information, the determining may include determining that the possession acquired from the missing store is combined into one of the possessions acquired from the stores indicated by the second store list information.

If there is a store that is present in the first store list information but is missing in the second store list information, the possession acquired from the missing store is determined to be combined into one of the possessions acquired from the stores indicated by the second store list information. The person may put a smaller possession into a larger possession, and if the store that is inferred from the smaller possession is not found in the store list information, it is determined that the smaller possession is put into the larger possession. By removing from the difference the store from which the smaller possession is obtained, it is correctly determined that the newly added store is a store the person has visited next.

The capturing may include capturing an external appearance multi-person image of a plurality of persons. The recognizing may include determining from the external appearance multi-person image whether the persons are in a same group, extracting a group image containing the persons that are determined to be in the same group from the external appearance multi-person image, and recognizing the persons of the same group from the group image. The inferring may include identifying the possessions carried by the persons of the same group from the group image, and inferring, from the identified possessions, the store from which the possessions have been obtained. The storing may include storing, in an associated form on the memory, group information indicating the persons of the same group, store information indicating the store that is inferred from the possessions carried by the persons of the same group, and time information at which the external appearance multi-person image has been captured. The determining may include the order of stores in which the same group has visited, based on a change in a time sequence of listing of stores indicated by the store information stored on the memory.

In the configuration described above, the external appearance multi-person image of multiple persons is captured. It is determined from the external appearance multi-person image whether the persons are in the same group. The group image containing the persons that are determined to be in the same group from the external appearance multi-person image is extracted. The persons in the same group are recognized from the group image. The possessions carried by the persons of the same group are identified from the group image. The store from which the possessions have been obtained is inferred from the identified possessions. The group information indicating the persons of the same group, the store information indicating the store that is inferred from the possessions carried by the persons of the same group, and the time information of the time at which the external appearance multi-person image is captured are stored in the associated form on the memory. The order of stores in which the same group has visited is determined based on a change in a time sequence of listing of stores indicated by the store information stored on the memory.

The multiple persons of the same group visit the store, and even if within the same group a different person takes over from another person the possessions from the store, the order of stores in which the same group has visited is determined at a higher accuracy level.

The external appearance image may be captured at different timings in the capturing, and in the capturing, the inferring and the storing may be performed each time the external appearance image is captured. In this configuration described above, the person information, the store information, and the time information are stored in an associated form on the memory each time the external appearance image is captured. The change in the time sequence of the listing of the stores indicated by the store information is retrieved from the memory. In accordance with the disclosure, not only a people stream analysis method performing the characteristic process described above is implemented, but also a people stream analysis apparatus and a people stream analysis system having a characteristic configuration corresponding to the characteristic process of the people stream analysis method are implemented. In another aspect, the same effect as that provided by the people stream analysis method may be achieved.

According another aspect of the disclosure, there is provided a people stream analysis apparatus. The people stream analysis apparatus includes an image information capturer that captures an external appearance image of a person, a person recognizer that recognizes the person from the external appearance image, a store inferrer that identifies from the external appearance image a possession carried by the person, and infers from the identified possession a store from which the possession has been obtained, a memory that stores, in an associated form on a memory, person information indicating the recognized person, store information indicating the inferred store, and time information indicating time at which the external appearance image has been captured, and an arrival store order determiner that determines an order of stores in which the person has visited, based on a change in a time sequence of listing of stores indicated by the store information stored on the memory.

The possessions may include a bag obtained from the store.

In the configuration described above, the bag obtained from the store has a logo, a color and a shape unique to the store. The store from which the bag has been obtained is correctly inferred, and the order of stores in which the person has visited is determined at a higher accuracy level.

The people stream analysis apparatus may further include a bag image information capturer that captures an external appearance image of the bag, and an image region of the external appearance image of the bag may be closer to the ground than an image captured region of the external appearance image of the person.

In the configuration described above, the image information capturer captures an external appearance image of a person, and the bag image information capturer captures the external appearance image of the bag. Since the image region of the external appearance image of the bag is closer to the ground than the image captured region of the external appearance image of the person, the person and the bag are identified as a higher accuracy level.

The people stream analysis apparatus may further include a bag image information capturer that captures an external appearance image of the bag. The external appearance image of the person may be an image that is captured from above, and the external appearance image of the bag may be an image that is captured from a lateral direction of the bag.

In the configuration described above, the image information capturer captures the external appearance image of the person, and the bag image information capturer captures the external appearance image of the bag. Since the external appearance image of the person is the image that has been captured from above, the person and the bag are identified at a higher accuracy level.

A handle portion of the bag may be smaller in size than an upper arm of a human.

In the configuration described above, the person may hold the bag in his or her hand rather than being shouldered. A distance between the ground and the logo of the bag remains generally constant, and the imaging region of the external appearance image of the bag may be narrowed, and recognition performance is thus increased.

A sticker that has information concerning a product purchased by the person may be attached to the bag.

In the configuration described above, the sticker that has information concerning the product purchased by the person is attached to the bag. The bag is thus tagged with the information related to the purchased product.

The sticker may have color information indicating a type and a price of the product purchased by the person.

In the configuration described above, since the sticker has the color information indicating the type and the price of the product purchased by the person, the type and the price of the product purchased by the person are identified by the color information of the sticker.

According to another aspect of the disclosure, there is provided a people stream analysis system. The people stream analysis system includes an imaging device that takes an external image of a person, and a people stream analysis apparatus. The people stream analysis apparatus includes an image information capturer that captures the external appearance image of the person taken by the imaging device, a person recognizer that recognizes the person from the external appearance image, a store inferrer that identifies from the external appearance image a possession carried by the person, and infers from the identified possession a store from which the possession has been obtained, a memory that stores, in an associated form, person information indicating the recognized person, store information indicating the inferred store, and time information indicating time at which the external appearance image is captured, and an arrival store order determiner that determines an order of stores in which the person has visited, based on a change in a time sequence of listing of stores indicated by the store information stored on the memory.

The characteristic process of the people stream analysis method of embodiments of the disclosure may be implemented as a computer program to be executed by a computer. The computer program may be distributed using a non-transitory computer-readable recording medium, such as a compact-disk read-only memory (CD-ROM) or via a communication network, such as the Internet.

The embodiments described below are specific examples of the disclosure. Numerical values, shapes, elements, steps, the order of steps are described for exemplary purposes only with reference to the embodiments, and are not intended to limit the disclosure. Among the elements in the embodiments, elements not described in the independent claims indicative of higher concepts may be described as optional elements. Elements of the embodiments may be combined. Some and other of the elements in the people stream analysis system and the people stream analysis apparatus of the embodiments of the disclosure may be configured as a distributed system in a computer.

The embodiments of the disclosure are described with reference to the drawings.

First Embodiment

FIG. 1 is a block diagram illustrating a configuration of a people stream analysis system of a first embodiment of the disclosure. The people stream analysis system of FIG. 1 includes a people stream analysis apparatus 1, multiple cameras 21 through 2n, and a display 3.

The people stream analysis apparatus 1 includes a cloud server including a processor, a memory, a communication apparatus, an external memory device, and the like, and is communicably connected to the multiple cameras 21 through 2n and the display 3 via a wired or wireless network 4.

The multiple cameras 21 through 2n include omnidirectional cameras that photograph an area around 360 degrees, and a communication device, and is deployed at a specific location in a commercial facility with multiple adjoining stores. The camera 21 photographs at different timings. The different timings may be regular time intervals. The same is true of the other cameras 22 through 2n. The multiple cameras 21 through 2n perform a photographing action at their deployed locations, thereby photographing an external appearance of each person who is visiting the commercial facility, and capturing an external appearance image of the person. As an example of the first embodiment, the external appearance image contains a single person. Each of the multiple cameras 21 through 2n is an example of an imaging device, and transmits a captured external appearance image to the people stream analysis apparatus 1 via the network 4. The configuration of each of the multiple cameras 21 through 2n is not limited to the configuration described above. A variety of imaging devices may be used as long as it is able to capture the external appearance image of a person.

Using the external appearance image received from one of the multiple cameras 21 through 2n, the people stream analysis apparatus 1 determines the order of stores in which the person has visited, and transmits to the display 3 via the network 4 arrival store order information indicating the order of stores the person has visited.

The display 3 includes a tablet, for example, and displays the arrival store order information received from the people stream analysis apparatus 1 to an owner or a manager of the commercial facility or store. The display 3 is not limited to the configuration described above, and may be one or more communication terminals, including a smart phone or a personal computer.

Figure 2:
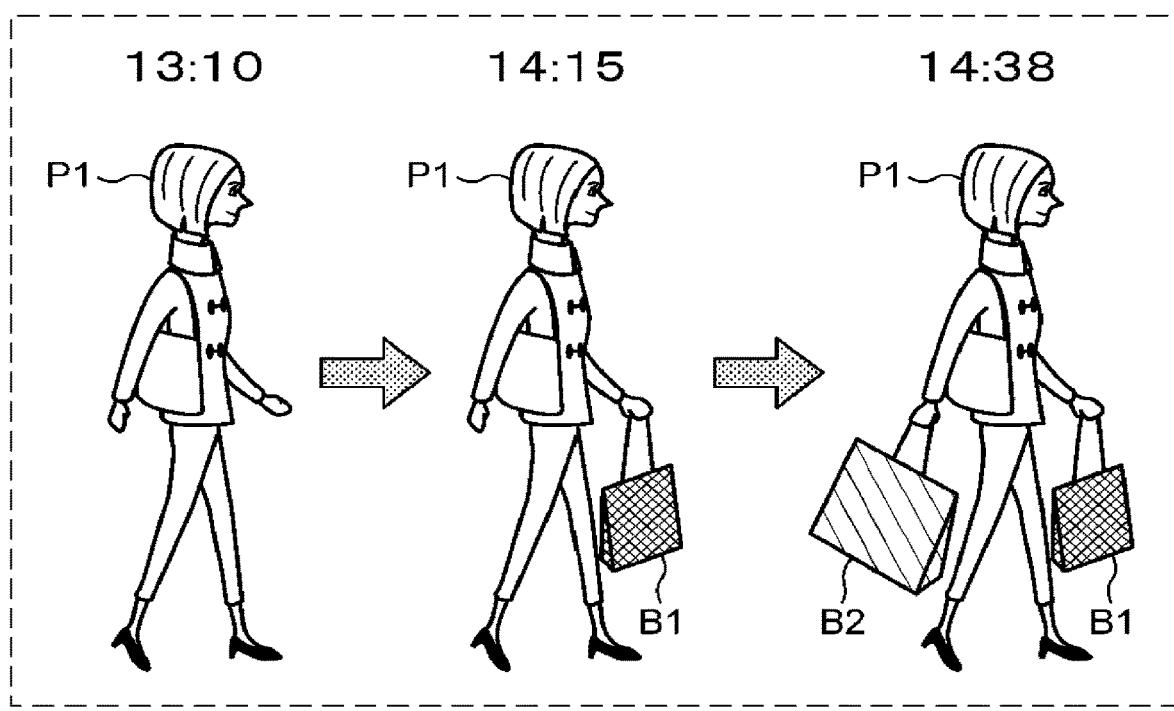
FIG. 2 diagrammatically illustrates an example of a time-lapsed series of person images.

FIG. 2 diagrammatically illustrates an example of a time-lapsed series of person images. Referring to FIG. 2, for example, a person P1 is photographed as a person image at 13:10, the person P1 carrying a bag B1 is photographed as a person image at time 14:15, and the person P1 carrying the bag B1 and a bag B2 is photographed as a person image at time 14:38.

When a person goes shopping in a commercial facility, such as a shopping mall, a bag with a store name or brand printed on it may be handed over to the person. As the possessions of the person P1, the bag B1 is added at time 4:15, and the bag B2 is added at time 14:38. During time period from 13:10 through 14:15, the person P1 may have visited a store from which the bag B1 was purchased, and also during time period from 14:15 through 14:38, the person P1 may have visited another store from which the bag B2 was purchased.

In accordance with the first embodiment, the stores the person has visited are determined by referencing the bags B1 and B2. The multiple cameras 21 through 2n may be simply deployed at typical locations in the commercial facility where many people are coming and going.

Figure 3:
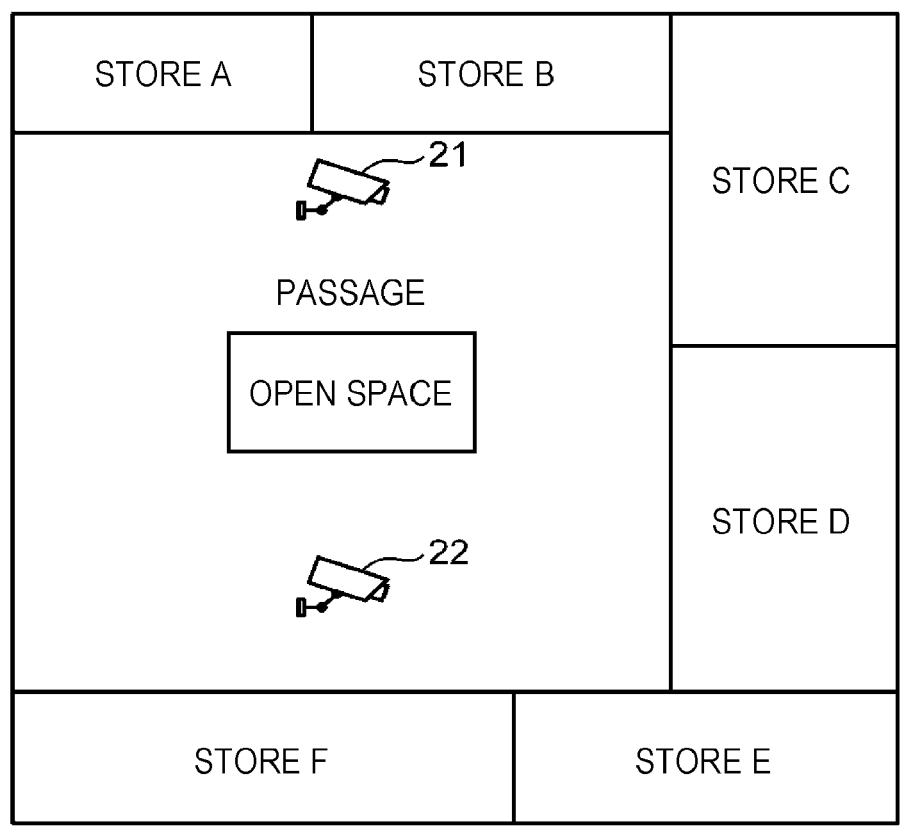
FIG. 3 illustrates a deployment example of cameras of FIG. 1.

FIG. 3 illustrates a deployment example of the multiple cameras of FIG. 1. Two cameras 21 and 22 are used here as the multiple cameras. In the store layout of FIG. 3, an open space is arranged in the center of a floor of the commercial facility and a passage surrounds the open space. Six stores A through F are arranged in a U-shape pattern.

Monitoring cameras in flow line management systems of the related art are deployed on a per store basis. Namely, one camera is deployed at each of the stores A through F, and a total of seven cameras are deployed.

On the other hand, in accordance with the first embodiment, the camera 21 is deployed at a location that allows persons coming in and leaving from the stores A through C, and the open space. The camera 21 photographs persons coming in and leaving from the stores D through F, and the open space. The camera 21 photographs persons coming in and leaving from the stores A through C, and the open space, and transmits the captured external appearance image to the people stream analysis apparatus 1. The camera 22 photographs persons coming in and leaving from the stores D through F, and the open space, and transmits the captured external appearance image to the people stream analysis apparatus 1. In accordance with the first embodiment, the two cameras 21 and 22 thus capture the external appearance image of a person and precisely determine the arrival store order of each person who has come to the stores A through F and the open space.

Related art flow line management systems use seven monitoring cameras. In accordance with the first embodiment, however, the camera capturing the external appearance image is not deployed on each of all the stores. Using the two cameras 21 and 22, the arrival store order of the person may be determined at a higher accuracy level in a simple configuration. The two cameras 21 and 22 are used in the above example. The disclosure is not limited to the two cameras. One camera or three or more cameras may be used.

Figure 4:
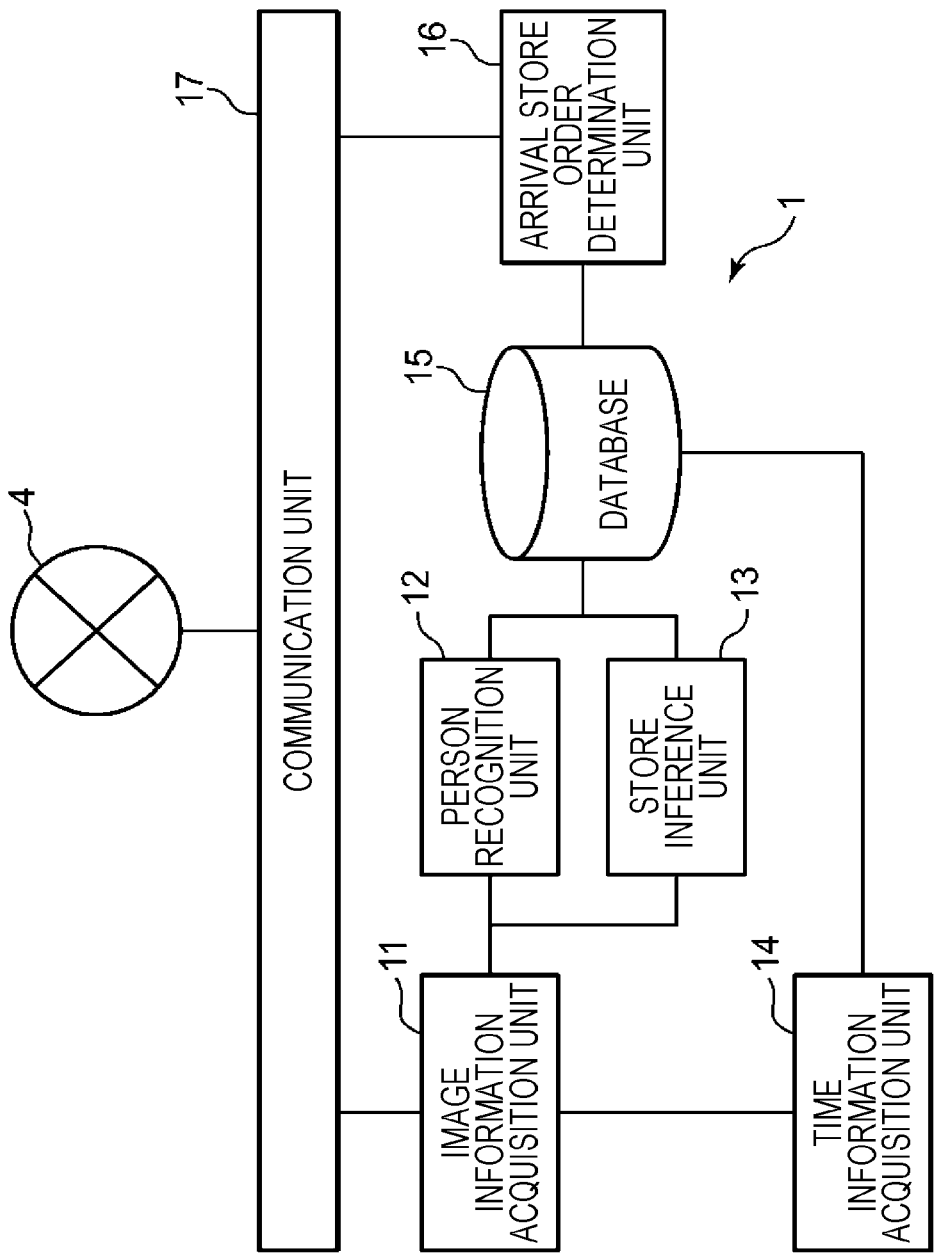
FIG. 4 is a block diagram illustrating an example of the configuration of a people stream analysis apparatus of FIG. 1.

FIG. 4 is a block diagram illustrating an example of the configuration of the people stream analysis apparatus 1 of FIG. 1. Referring to FIG. 4, the people stream analysis apparatus 1 includes an image information acquisition unit 11, a person recognition unit 12, a store inference unit 13, a time information acquisition unit 14, a database 15, an arrival store order determination unit 16, and a communication unit 17.

The communication unit 17 outputs external appearance image information to the image information acquisition unit 11 each time the communication unit 17 receives the external appearance image information from one of the multiple cameras 21 through 2n via the network 4. Each time the image information acquisition unit 11 receives the external appearance image of a person from the communication unit 17, the image information acquisition unit 11 outputs the external appearance image to the person recognition unit 12 and the store inference unit 13, and outputs to the time information acquisition unit 14 time information indicating time at which the external appearance image has been captured.

The person recognition unit 12 recognizes the person from the captured external appearance image from the image information acquisition unit 11, and outputs person information of the recognized person to the database 15.

The store inference unit 13 identifies a possession carried by the person from the external appearance image acquired by the image information acquisition unit 11, and infers from the identified possession the store from which the possession has been obtained. If the possession that is obtained from the store is a bag, the store inference unit 13 infers the store from which the bag has been obtained, based on a logo, a color, and a shape of the bag identifying the bag. If the bag has the log identifying the store, the store inference unit 13 infers the store from which the bag is obtained. The store inference unit 13 outputs the store information indicating the inferred store to the database 15.

The time information acquisition unit 14 outputs the time information acquired from the image information acquisition unit 11 to the database 15.

The database 15 includes a memory and/or an external storage device, and stores, in an associated form, person information acquired from the person recognition unit 12, store information acquired from the store inference unit 13, and time information acquired from the time information acquisition unit 14.

The arrival store order determination unit 16 determines on each person the order of stores each person has visited, based on a change in the time sequence of listing of stores related to the stores indicated by the store information stored on the database 15, and outputs the person information and the arrival store order information which indicates the order of stores in which the person has visited.

More specifically, the arrival store order determination unit 16 calculates a difference between first store list information indicating a list of stores inferred based on the possessions that are carried by the person at a first time point and second store list information indicating a list of stores inferred based on the possessions that are carried by the person at a second time point, and determines the order of the stored visited by the person on a per person basis.

The communication unit 17 transmits the arrival store order information and the person information to the display 3 via the network 4. The image information acquisition unit 11 may include a communication circuit as a hardware configuration. The display 3 displays the order of arrival stores of each person from the received arrival store order information and the person information, thereby notifying the owner or manager of each the commercial facility or store of the order of arrival stores.

Figure 5:
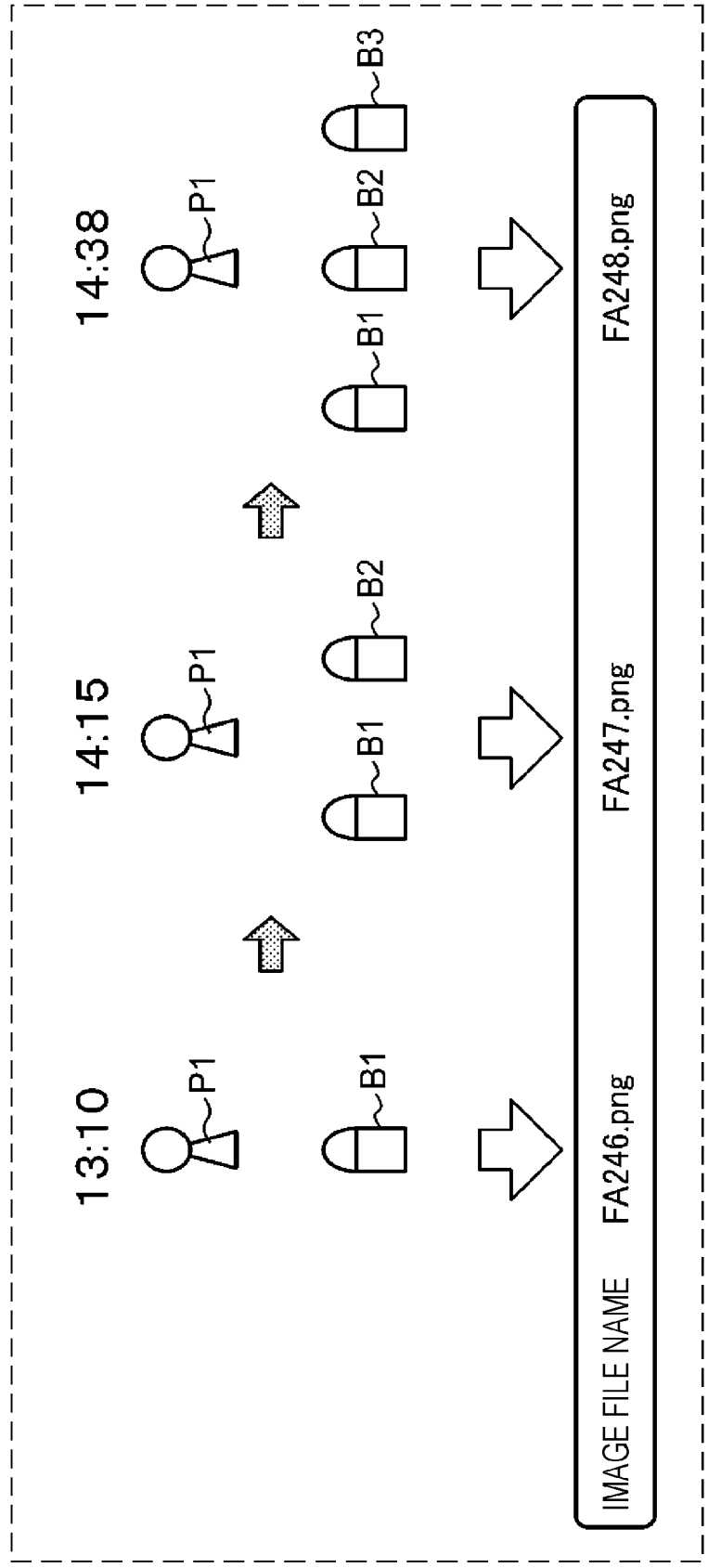
FIG. 5 diagrammatically illustrates a change in possessions of a person.

The process of the people stream analysis apparatus 1 configured as described above is specifically described. FIG. 5 diagrammatically illustrates a change in possessions of a person. In the discussion that follows, one of the cameras 21 through 2n is designated camera 2.

Referring to FIG. 5, a person P1 carries a bag B1 as a possession at time 13:10, and the camera 2 captures the image of the person P1 carrying the bag B1. The camera 2 transmits to the people stream analysis apparatus 1 image data having an image file name FA246.png, as the external appearance image of the person P1 carrying the bag B1.

The person P1 additionally carries a bag B2 as a possession at time 14:15, and the camera 2 captures the image of the person P1 carrying the bags B1 and B2. The camera 2 transmits to the people stream analysis apparatus 1 image data having an image file name FA247.png, as the external appearance image of the person P1 carrying the bags B1 and B2.

Furthermore, the person P1 additionally carries a bag B3 as a possession at time 14:38, and the camera 2 captures the image of the person P1 carrying the bags B1, B2, and B3. The camera 2 transmits to the people stream analysis apparatus 1 image data having an image file name FA248.png, as the external appearance image of the person P1 carrying the bags B1, B2, and B3.

FIG. 6 illustrates an example of an image file table generated by the image information acquisition unit 11 of FIG. 4. When the external appearance image of FIG. 5 is transmitted to the people stream analysis apparatus 1, the image information acquisition unit 11 generates the image file table of FIG. 6 as a dynamic table that associates time when the external appearance image has been captured with an image file name captured by the camera 2.

The image file table of FIG. 6 stores time and an image file name in a table format. For example, the image file name of the external appearance image at time 13:10 is FAP246.png. The image information acquisition unit 11 outputs the generated image file table and the external appearance image to the person recognition unit 12 and the store inference unit 13 while also outputting the image file table to the time information acquisition unit 14.

FIG. 7 illustrates an example of a person identification table used by the person recognition unit 12 of FIG. 4. The person recognition unit 12 pre-stores, for example, the person recognition table of FIG. 7 as a static table that associates personal identification information (ID) with a labeled person image file list.

The person identification table of FIG. 7 stores a personal ID with a labeled person image file in a table format. For example, a person P123 as a personal ID is associated with image data FA111.png, FA112.png, . . . , of the labeled person image file list.

The person recognition unit 12 constructs a learning model, based on data of the person identification table, and identifies a person of the external appearance image using the constructed learning model. In this case, the person recognition unit 12 may learn not only the face image of a person, but may learn generally the appearance, the clothes, and the shape of a person. Even if the number of the cameras 21 through 2n is smaller, each person is correctly identified.

FIG. 8 illustrates an example of a store inference table used by the store inference unit 13 of FIG. 4. The store inference unit 13 pre-stores, for example, the store inference table of FIG. 8, as a static table that associates a store ID and a labeled possession file list.

The store inference table of FIG. 8 stores the store ID and the labeled possession image file list in a table format. For example, the image of a possession, such as a bag provided by a store having a store ID SH234, is pre-stored as image data of labeled possession image file lists B777.png, B778.png, . . . . The store inference unit 13 constructs a learning model based on the data of the store inference table, identifies the possession carried by the person in the external appearance image using the constructed learning model, and infers the store from the identified possession.

If the possession is a bag, a logo indentifying a store, including a brand name, a store name, a logo mark, a trademark, or a unique design, is formed on the surface of the bag. The store inference unit 13 generally learns not only the shape of the bag, but also the logo identifying the store. Even if the number of the cameras 21 through 2n is smaller, the bag is correctly determined, and the store is inferred from the identified bag at a higher accuracy level. The possession is not limited to the bag. A variety of possessions may be used. As long as a store is identified, another possession, such as a pamphlet distributed by the store, may be used.

FIG. 9 illustrates an example of a store table used by an arrival store order determination unit 16 of FIG. 4. The arrival store order determination unit 16 pre-stores the store table of FIG. 9 as a static table that associates the store ID with the store name. The store table of FIG. 9 pre-stores the store ID and the store name in a table format. For example, a store ID of SH234 is associated with a store A as the store name.

FIG. 10 illustrates an example of an arrival store order estimation table stored on the database 15 of FIG. 4. The time information acquisition unit 14 stores the time of the image file table of FIG. 6 at a time column of the time (an example of the time information) of the arrival store order estimation table of FIG. 10. The person recognition unit 12 stores the person ID, estimated using the external appearance image of the image file table of FIG. 6, for the recognized person ID (an example of the person information) of the arrival store order estimation table of FIG. 10. The store inference unit 13 stores the store ID estimated using the external appearance image in the image file table of FIG. 6 for an inferred store ID list (an example of the store information or the store list information) of the arrival store order estimation table of FIG. 10.

The arrival store order determination unit 16 determines a difference between the current inferred store ID list and the inferred store ID list at an immediately preceding time, and determines that a store ID that is present in the current inferred store ID list but is not present in the inferred store ID list at the immediately preceding time is a store ID of a store that the person has newly visited. The arrival store order determination unit 16 references the store table of FIG. 9, and stores the store name, responsive to the store ID that is determined to be newly visited, at a name of a newly visited store in the arrival store order estimation table of FIG. 10.

In the above operation, the arrival store order estimation table is generated on the database 15. The arrival store order estimation table associates time, recognized person ID, inferred store ID list, and name of newly visited store. By reading in chronological sequence the store names stored at the name of the newly visited store, the arrival store order determination unit 16 determines the order of stores in which each person has visited, and outputs the arrival store order information indicating the order of visited stores on each person to the communication unit 17. As illustrated in FIG. 10, for example, the person having a person ID P123 has visited the stores in the order of stores of a store A, a store B, and then a store C. In the above example, the external appearance image is image data in a png format. The format is not limited to the png format. Image data in other formats may be used. For example, a gif format or a jpg format may be used.

The process of the arrival store order determination unit 16 is described below that is performed if there is any store present among the stores in the inferred store ID list at the immediately preceding time, but missing in the current inferred store ID list.

Figure 11:
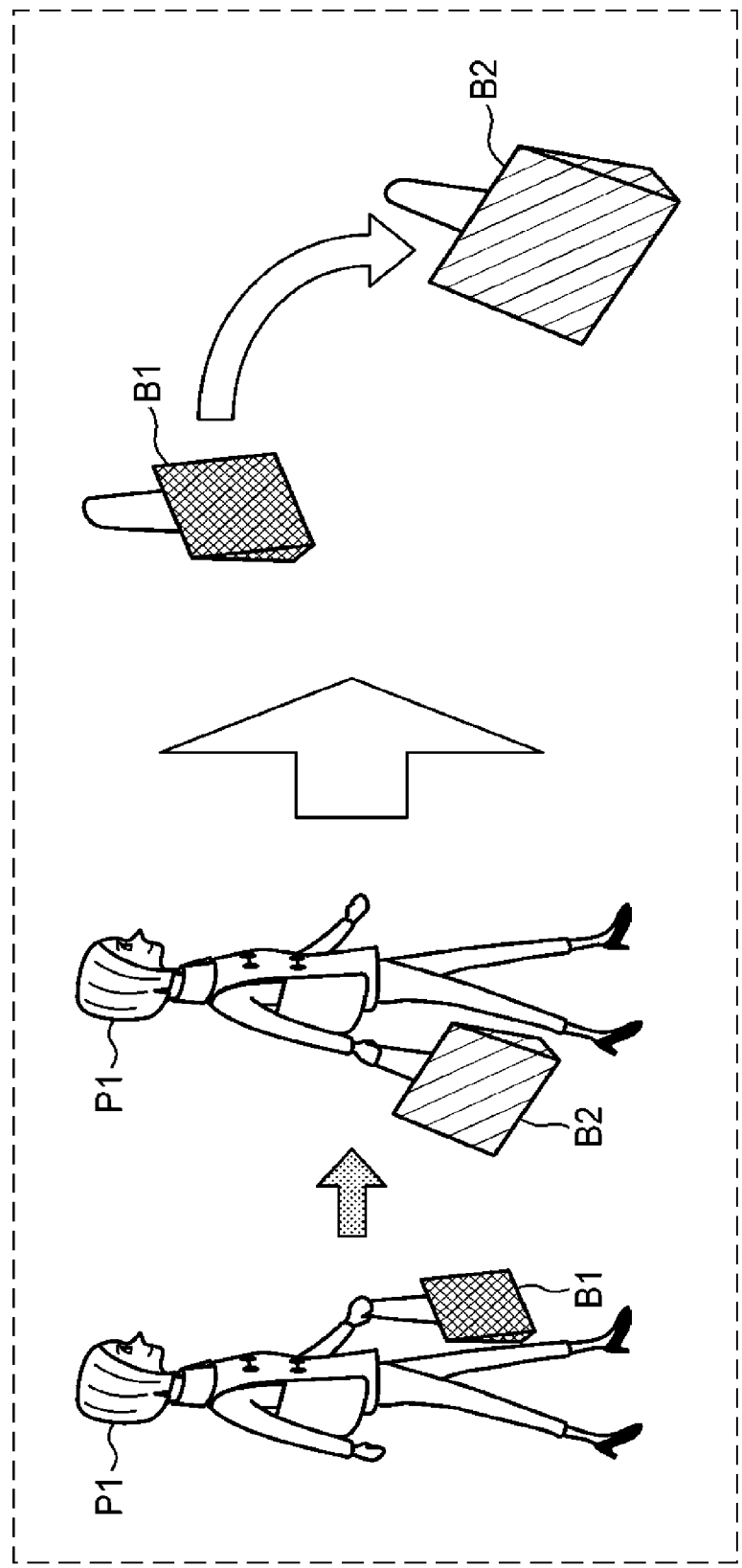
FIG. 11 diagrammatically illustrates another example of a change in the possessions carried by the person.

FIG. 11 diagrammatically illustrates another example of a change in the possessions carried by the person. Referring to FIG. 11, after an external appearance image is captured where a person P1 carries a smaller bag B1, an external appearance image may be captured where the person P1 carries a larger bag B2 only without carrying the smaller bag B1. This is because the person P1 may carry the larger bag B2 having the smaller bag B1 put therein.

In accordance with the first embodiment, if the bag B1 carried immediately before is not recognized any more, it is contemplated that the bag B1 is combined into the bag B2. The bag B1 is hereinafter excluded in the process, and a difference is calculated with respect to the bag B2 only. The order of stores visited by the person is determined based on a change in the time-elapsed series of stores indicated by the store information.

More specifically, if there is any store present among the stores in the inferred store ID list at the immediately preceding time (an example of first store list information), but missing in the current inferred store ID list (an example of second store list information), the arrival store order determination unit 16 determines that a possession obtained from the missing store is combined into any of the possessions obtained from a store that is indicated by the current inferred store ID list.

More specifically, the person puts a smaller possession into a larger possession, and if a store inferred from the smaller possession is not found in the stores in the store list information, the smaller possession is combined into the larger possession obtained from any of the stores in the store list. The store from which the smaller possession has been obtained is excluded thereafter from the difference operation. The newly added store is thus determined to be a store the person has visited next. In this way, the order of stores visited by the person is determined on each person.

FIG. 12 illustrates another example of the arrival store order estimation table stored on the database 15 of FIG. 4. The time information acquisition unit 14 stores time in the image file table of FIG. 6 as time in the arrival store order estimation table of FIG. 12. The person recognition unit 12 stores the person ID estimated using the external appearance image in the image file table of FIG. 6 as the recognized person ID in the arrival store order estimation table of FIG. 12. The store inference unit 13 stores the store ID estimated using the external appearance image in the image file table of FIG. 6 in the inferred store ID list of the arrival store order estimation table of FIG. 12.

The arrival store order determination unit 16 determines a difference between the current inferred store ID list and the inferred store ID list at the immediately preceding time. If there is a store ID (missing store) in the current inferred store ID list, the arrival store order determination unit 16 determines that a possession of the corresponding store is combined in the possession corresponding to the leading store ID in the current inferred store ID list, and generates a merger store table that combines a merger store ID and an merged store ID.

FIG. 13 illustrates an example of a merger store table generated by the arrival store order determination unit 16 of FIG. 4. Referring to FIG. 12, SH234 as a store ID may be present in the inferred store ID list at immediately preceding time 14:15, and may not be present in the inferred store ID list (missing store), and but SH567 as a leading store ID may be present at the current time 14:38. Referring to FIG. 13, the arrival store order determination unit 16 generates a merger store table to combine SH234 as the missing store into the leading SH567. In the merger store table, SH567 is stored as a merger store ID and SH234 as a merged store ID.

The arrival store order determination unit 16 references the merger store table and determines that a merged store ID not present in the current inferred store ID list is combined into a merger store ID that is present in both the current inferred store ID list and the inferred store ID list at the immediately preceding time, and excludes the merged store ID from the difference. The arrival store order determination unit 16 determines that a store ID that is present in the current inferred store ID list but is not present in the inferred store ID list at the immediately preceding time is a store ID of a store the person has newly visited. By referencing the store table of FIG. 9, the arrival store order determination unit 16 stores the store name, corresponding to the store ID that is determined to be new, at the name of the newly visited store of FIG. 12.

Referring to FIG. 12, the current time may now be 14:38. The inferred store ID list lists SH234 at the immediately preceding time, but the current inferred store ID list does not list SH234. SH567 is present in the inferred store ID list at the immediately preceding time and the current inferred store ID list. In this case, the arrival store order determination unit 16 determines that a possession obtained from the store having the store ID SH234 present at 14:15 is combined into a possession obtained from the store having the store ID SH567 leading in the current inferred store ID list. With SH234 excluded, the arrival store order determination unit 16 calculates a difference between the inferred store ID list at the immediately preceding time and the current inferred store ID list, and determines that SH789 as the difference is a store ID of the newly visited store, and stores the store C at the name of the newly visited store of FIG. 12.

The person thus puts a smaller possession into a larger possession, and if a store inferred from the smaller possession is not found in the stores in the store list information (inferred store ID list), the smaller possession is combined into the larger possession obtained from any of the stores in the store list (inferred store ID list). The store from which the smaller possession has been obtained is excluded from the difference operation. The newly added store is thus determined to be a store the person has visited next. In this way, the order of stores visited by the person is determined on each person at a higher accuracy level.

Figure 14:
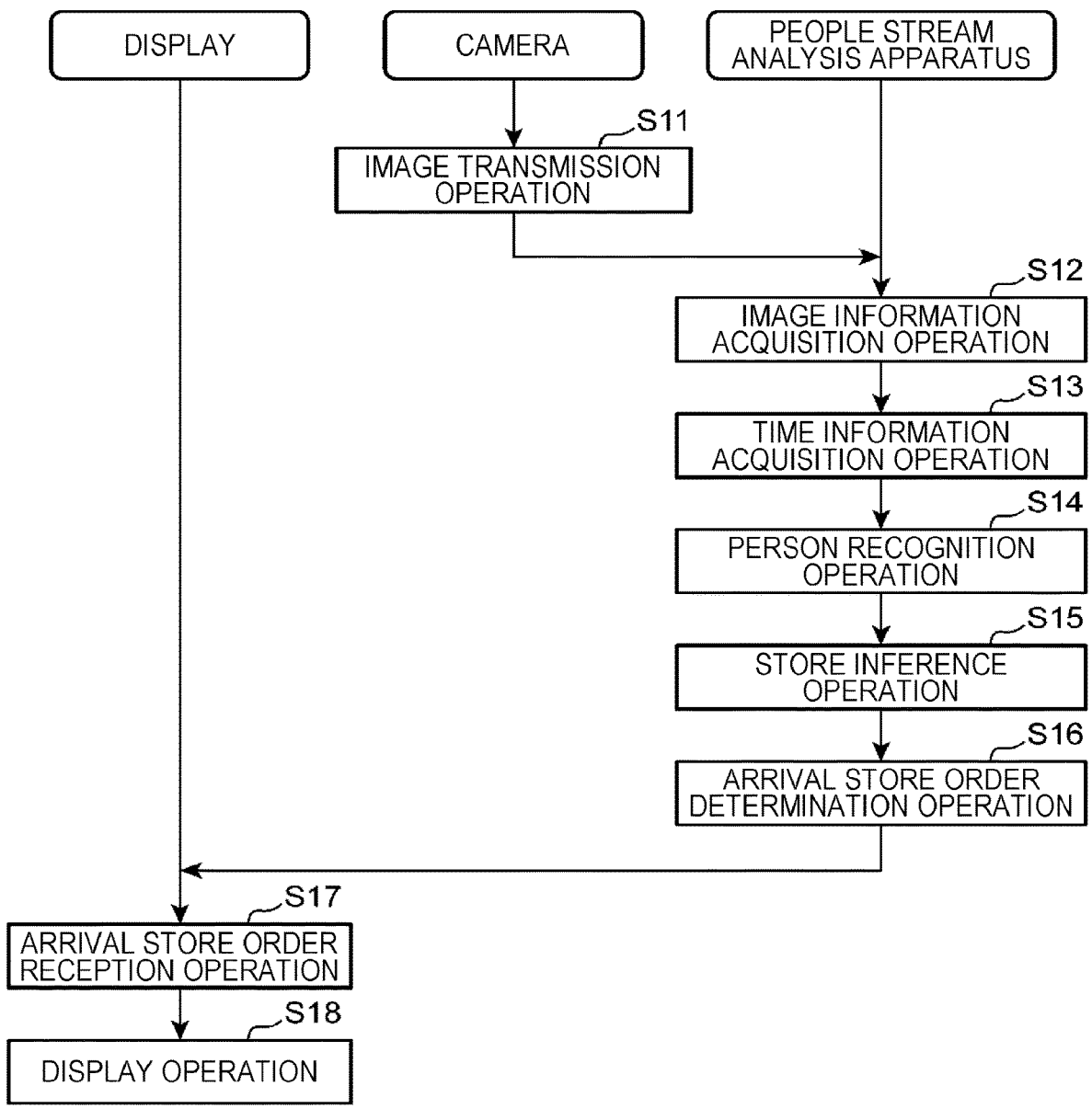
FIG. 14 is a flowchart illustrating an example of a people stream analysis process by a people stream analysis system of FIG. 1.

The people stream analysis method of the people stream analysis system thus configured is described below. FIG. 14 is a flowchart illustrating an example of the people stream analysis process by the people stream analysis system of FIG. 1.

The multiple cameras 21 through 2n perform an image transmission operation by capturing the external appearance image of a person visiting the commercial facility and by transmitting the captured external appearance image to the people stream analysis apparatus 1 (step S11). The multiple cameras 21 through 2n may transmit the external appearance image together with camera identification information (camera ID) to the people stream analysis apparatus 1. In such a case, the accuracy level of each of a person recognition operation, a store estimation operation, and an arrival store order determination operation described below may be increased by fixing a camera position of a camera having captured the external appearance image using the camera ID and each of the above operations is performed using the fixed camera position.

The communication unit 17 in the people stream analysis apparatus 1 receives external appearance image information from the multiple cameras 21 through 2n and outputs the external appearance image information to the image information acquisition unit 11. The image information acquisition unit 11 performs an image information acquisition operation by acquiring the external appearance image of a person, by outputting the external appearance image to each of the person recognition unit 12 and the store inference unit 13, and by outputting to the time information acquisition unit 14 the time information indicating the time at which the external appearance image has been captured (step S12).

The time information acquisition unit 14 performs a time information acquisition operation by storing the time information acquired from the image information acquisition unit 11 in the arrival store order estimation table of the database 15 (step S13).

The person recognition unit 12 performs a person recognition operation by recognizing the person from the external appearance image acquired from the image information acquisition unit 11, and by storing the person information (recognized person ID) indicating the recognized person in the arrival store order estimation table of the database 15 (step S14).

The store inference unit 13 performs a store inference operation by identifying a possession carried by the person from the external appearance image acquired by the image information acquisition unit 11, by inferring the store from which the identified possession has been obtained, and by storing the store information (inferred store ID list) indicating the inferred store in the arrival store order estimation table of the database 15 (step S15).

The arrival store order determination unit 16 performs an arrival store order determination operation by determining the order of stores visited by the persons on a per person basis based on a change in a time sequence of listing of the stores from the arrival store order estimation table of the database 15, by storing the store name corresponding to the store ID of the store newly visited by the person in the arrival store order estimation table of the database 15, by outputting the arrival store order information indicating the order of stores visited by each person, together with the person information to the communication unit 17, and by transmitting the arrival store order information and the person information from the communication unit 17 to the display 3 (step S16).

The display 3 performs an arrival store order reception operation to receive the arrival store order information and the person information (step S17).

Finally, the display 3 performs a display operation to display the order of stores visited by each person from the received arrival store order information (step S18).

In accordance with the first embodiment, through the process described above, the external appearance image of the person is captured, and the person is recognized from the captured external appearance image. The possession carried by the person is identified from the captured external appearance image. The store from which the identified possession has been obtained is inferred. The person information (recognized person ID) indicating the recognized person, the store information (inferred store ID list) indicating the inferred store, and the time information indicating the time at which the external appearance image is captured are stored in an associated form on the database 15. The order of stores visited by the person is determined based on a change in the time sequence of the listing of the stores indicated by the store information stored on the database 15.

In accordance with the first embodiment, without deploying the cameras 21 through 2n capturing the external appearance image respectively in the stores on a per store basis, the possession is identified from the external appearance image of the person, the store from which the possession has been obtained is inferred correctly. The newly added store is thus determined to be a store to which the person has visited. The order of stores visited by the person is determined at a higher accuracy level with a simple configuration.

In accordance with the first embodiment of the person information, the possession carried by the person is identified from the captured external appearance image, and all the stores from which the possessions are obtained are inferred from all the identified possessions. A person may visit the commercial facility with a possession having a store name printed on it, for example, with his or her own bag. In such a case, even if the person has not yet visited that store, but it looks like the person has visited that store. For this reason, a camera may be deployed at the entrance of the commercial facility, and based on the external appearance image captured by the camera deployed at the entrance, the possession identified as his or her own bag may be excluded from the estimation target of the order of stores.

Second Embodiment

In accordance with the first embodiment, the order of visited stores is determined on a per person basis. Customers go shopping not only alone but also in groups, such as a family, or friends. In such a case, the possessions may change between members of the group, for example, a person carrying the bag may change from one person to another. In accordance with the second embodiment, customer groups are recognized, the possessions carried are identified on a per group basis, the stores are inferred from the identified possessions, and the order of stores is determined on a per group basis.

Figure 15:
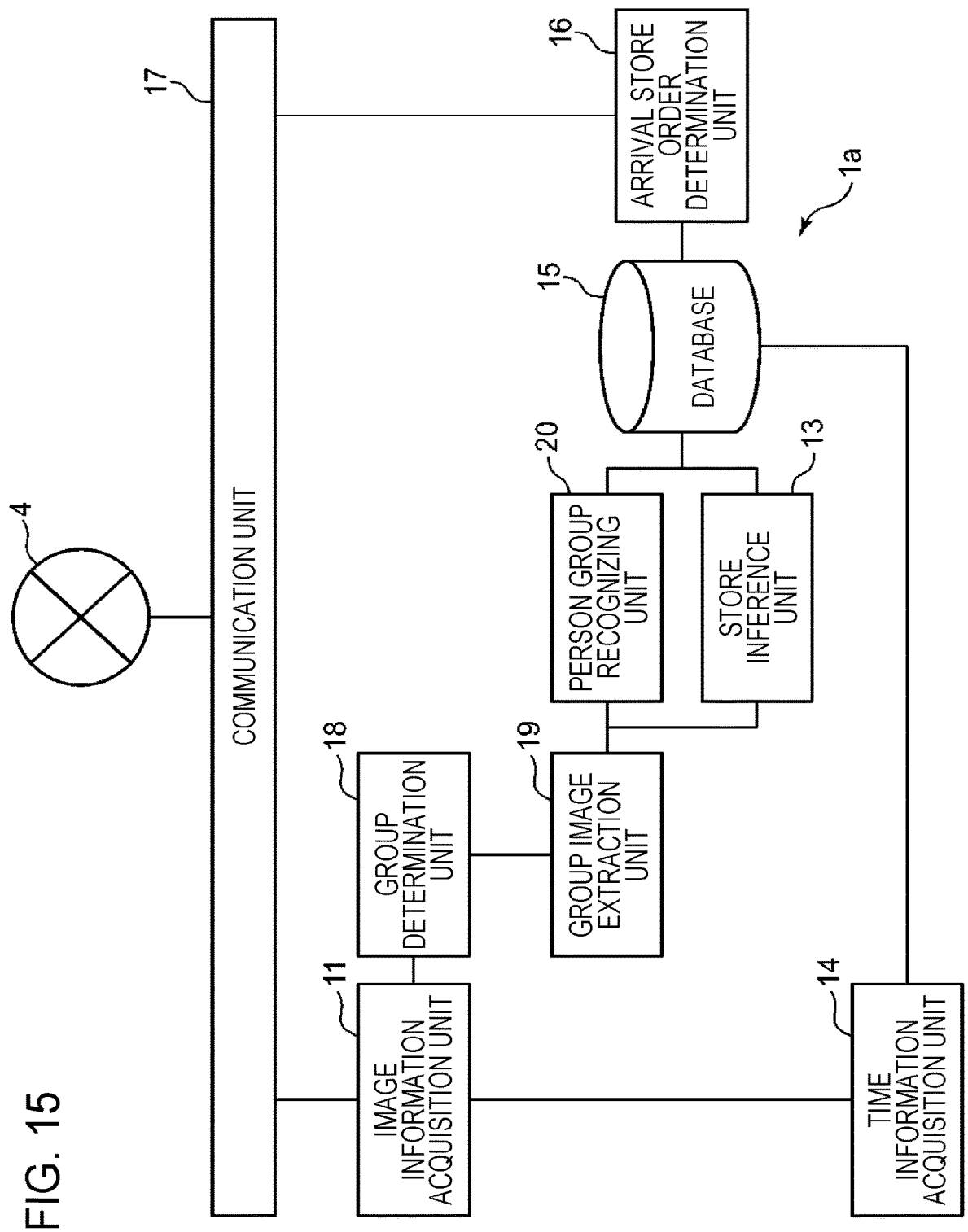
FIG. 15 is a block diagram illustrating a people stream analysis apparatus in a people stream analysis system of a second embodiment of the disclosure.

FIG. 15 is a block diagram illustrating a people stream analysis apparatus in a people stream analysis system of a second embodiment of the disclosure. The people stream analysis system of the second embodiment is identical to the people stream analysis system of FIG. 1 except that the people stream analysis apparatus 1 of FIG. 1 is replaced with a people stream analysis apparatus 1a of FIG. 15. The people stream analysis system is thus not illustrated. Elements identical to those of FIG. 1 are designated with the same reference numerals, and a difference from the people stream analysis system of FIG. 1 is described in detail below.

The people stream analysis apparatus 1a of FIG. 15 may be a cloud server including a processor, a memory, a communication apparatus, an external memory device, and the like, and is communicably connected to the multiple cameras 21 through 2n and the display 3 via a wired or wireless network 4. The people stream analysis apparatus 1a includes an image information acquisition unit 11, a store inference unit 13, a time information acquisition unit 14, a database 15, an arrival store order determination unit 16, a communication unit 17, a group determination unit 18, a group image extraction unit 19, and a person group recognizing unit 20.

The camera 21 photographs multiple persons visiting the commercial facility, thereby capturing an external appearance image of appearances of the persons. The camera 21 photographs at different timings. The different timings may be regular time intervals. The external appearance image of the appearances of the multiple persons may also be referred to as an external appearance multi-person image. The camera 21 transmits the captured external appearance multi-person image to the people stream analysis apparatus 1a via the network 4. The above discussion focuses on the operation of the camera 21. Like the camera 21, the remaining cameras 22 through 2n transmit the external appearance multi-person image to the people stream analysis apparatus 1a, but the operation thereof is omitted herein.

The communication unit 17 outputs external appearance multi-person image to the image information acquisition unit 11 each time the communication unit 17 receives the external appearance multi-person image from one of the multiple cameras 21 through 2n via the network 4. Each time the image information acquisition unit 11 receives the external appearance multi-person image from the communication unit 17, the image information acquisition unit 11 outputs the external appearance multi-person image to the group determination unit 18, and outputs to the time information acquisition unit 14 time information indicating time at which the external appearance multi-person image has been captured.

The group determination unit 18 determines from the external appearance multi-person image captured by the image information acquisition unit 11 whether the multiple persons are in the same group. The group determination unit 18 extracts the external appearance multi-person image with the multiple persons determined to be in the same group and then outputs the external appearance multi-person image to the group image extraction unit 19. If the multiple persons are not in the same group, each person may be recognized in a way similar to the first embodiment.

The group image extraction unit 19 extracts a group image including multiple persons that are determined to be in the same group, from the external appearance multi-person image in which multiple persons are determined to be in the same group, and then outputs the group image to the person group recognizing unit 20 and the store inference unit 13.

The person group recognizing unit 20 recognizes the multiple persons of the same group from the group image extracted by the group image extraction unit 19, and outputs to the database 15 group information indicating the multiple persons of the recognized group.

The store inference unit 13 identifies the possessions carried by the multiple persons from the group image extracted by the group image extraction unit 19, infers from the identified possession the store from which the possession have been obtained, and outputs to the database 15 the store information indicating the inferred store.

The time information acquisition unit 14 outputs the time information acquired from the image information acquisition unit 11 to the database 15.

The database 15 stores in an associated form the group information acquired from the person group recognizing unit 20, the store information acquired from the store inference unit 13, and the time information acquired from the time information acquisition unit 14.

The arrival store order determination unit 16 determines, on a per group basis, the order of stores visited by the multiple persons of the same group based on a change in the time sequence of the listing of the stores indicated by the store information stored on the database 15, and outputs to the communication unit 17 the group information together with the arrival store order information indicating the order of stores visited by each determined group.

The communication unit 17 transmits the arrival store order information and the group information to the display 3 via the network 4. The display 3 displays the order of stores visited by each group from the received arrival store order information, thereby notifying the owner or manager of the commercial facility or store of the order of stores visited by each group.

The operation of the people stream analysis apparatus 1a thus constructed is specifically described. The group determination unit 18 uses a group determination method of related art and determines whether multiple persons are in the same group, from an image file (the external appearance multi-person image) of an image file table that is similar to the image file table of FIG. 6 and associates the time at which the external appearance multi-person image has been captured with an image file name. The group determination unit 18 extracts the external appearance multi-person image from which the multiple persons are in the same group, and outputs the external appearance multi-person image to the group image extraction unit 19. The group image extraction unit 19 extracts a group image containing multiple persons determined to be in the same group from the external appearance multi-person image from which multiple persons are in the same groups, and outputs the group image to the person group recognizing unit 20. Using the group determination method of related art, the person group recognizing unit 20 recognizes the person ID from the group image, and generate a person group table that lists the multiple persons of the same group.

FIG. 16 illustrates an example of the person group table generated by the person group recognizing unit 20 of FIG. 15. Referring to FIG. 16, the person group recognizing unit 20 generates the person group table that associates a person group ID (recognition information) identifying a group with a person ID list indicating person IDs of multiple persons in the group. In the example of FIG. 16, the group having a person group ID G111 includes three persons P123, P124, and P125.

The group determination method may be a method disclosed in Japanese Unexamined Patent Application Publication No. 2014-229068 (the flow line of a person is acquired by estimating coordinates of the person from an image, and multiple persons moving in the same flow line are determined to move in a group), or a method disclosed in Japanese Unexamined Patent Application Publication No. 2013-50945 (a body orientation and line of sight of a person are acquired from a camera image, and multiple persons who are facing each other or who are looking in the same direction are determined to be in a group).

The group determination methods described above are described for exemplary purposes only, and the disclosure is not limited to these methods. For example, in one method, a database is prepared which registers a group ID and person face image IDs of multiple persons in association with each other in advance. If the face images of the persons are detected, the persons are determined to be in the same group. In another method, position information of a portable terminal or another radio terminal may be used instead of image. In yet another method, voices are captured in addition to images, and if a conversation is detected among a group of persons, those persons are determined to be in the same group.

FIG. 17 illustrates an example of the arrival store order estimation table stored on the database 15 of FIG. 15. The time information acquisition unit 14 stores the time of the image file table, associating the time at which the external appearance multi-person image has been captured with the image file name, at the time of the arrival store order estimation table (an example of the time information) of FIG. 17. The person group recognizing unit 20 stores the person group ID in the person group table of FIG. 16, recognized by using the group image extracted from the external appearance multi-person image in the image file table, at a recognized person group ID (an example of the group information) in the arrival store order estimation table of FIG. 17. The store inference unit 13 stores the store ID, inferred using the external appearance multi-person image in the image file table, at an inferred store ID list (an example of the store information or the store list information) in the arrival store order estimation table of FIG. 17.

The arrival store order determination unit 16 determines a difference between the current inferred store ID list and the inferred store ID list at the immediately preceding time, and determines that the store ID that is present in the current inferred store ID list but not present in the inferred store ID list at the immediately preceding time is a store ID of a store that the person has newly visited. The arrival store order determination unit 16 references the store table of FIG. 9, and stores the store name responsive to the store ID, which has been determined to be new, at a name of newly visited store in the arrival store order estimation table of FIG. 17.

Via the above operation, the database 15 stores the arrival store order estimation table that associates the time, the recognized person group ID, the inferred store ID list, and the name of the newly visited store in association with each other. By reading the store names stored at the names of the newly visited stores in time sequence, the arrival store order determination unit 16 determines the order of stores visited by multiple persons of the same group on a per group basis, and outputs the arrival store order information indicating the order of stores visited by each group to the communication unit 17. Referring to FIG. 17, a group having a person group ID G111 has visited the stores in the order of a store A, a store B, and a store C.

Figure 18:
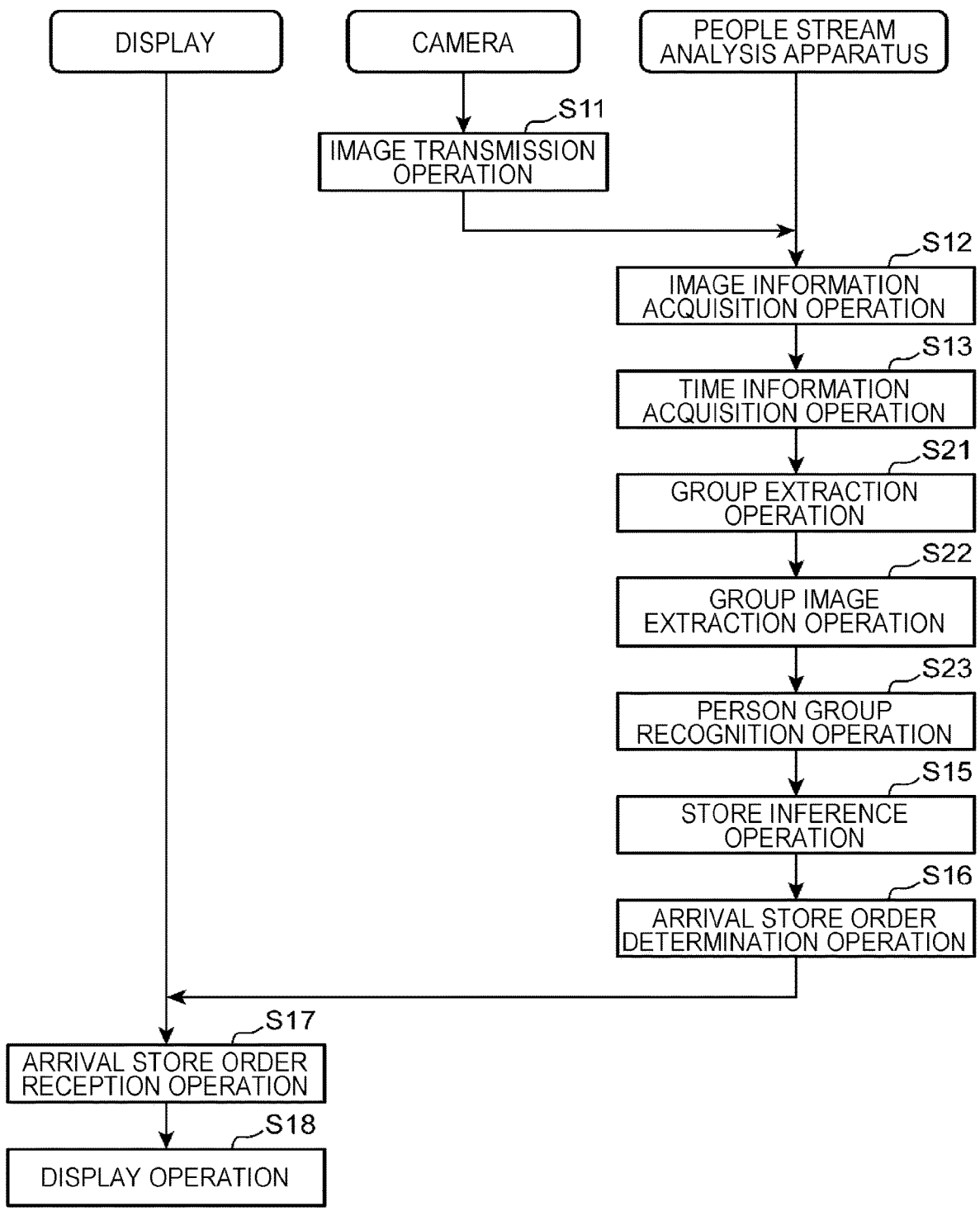
FIG. 18 is a flowchart illustrating an example of a people stream analysis process by the people stream analysis system of the second embodiment of the disclosure.

The people stream analysis process performed by the people stream analysis system thus constructed is described below. FIG. 18 is a flowchart illustrating an example of the people stream analysis process by the people stream analysis system of the second embodiment of the disclosure.

The cameras 21 through 2n perform an image transmission process by capturing the external appearance multi-person image of multiple persons having visited the commercial facility, and by transmitting the captured external appearance multi-person image to the people stream analysis apparatus 1a (step S11).

An image information acquisition operation is then performed. Specifically, each time the communication unit 17 in the people stream analysis apparatus 1a receives the external appearance multi-person image transmitted from one of the cameras 21 through 2n, the communication unit 17 outputs the external appearance multi-person image to the image information acquisition unit 11. Each time the image information acquisition unit 11 acquires the external appearance multi-person image containing multiple persons, the image information acquisition unit 11 outputs the external appearance multi-person image to the group determination unit 18 and outputs to the time information acquisition unit 14 the time information indicating the time at which the external appearance multi-person image has been captured (step S12).

The time information acquisition unit 14 performs a time information acquisition operation by storing the time information acquired from the image information acquisition unit 11 in the arrival store order estimation table of the database 15 (step S13).

The group determination unit 18 performs a group extraction operation by determining from the external appearance multi-person image captured by the image information acquisition unit 11 whether the multiple persons are in the same group, and extracts the external appearance multi-person image in which the multiple persons are determined to be in the same group, and outputs the external appearance multi-person image to the group image extraction unit 19 (step S21).

The group image extraction unit 19 performs a group image extraction operation by extracting a group image containing multiple persons determined to be in the same group from the external appearance multi-person images that are determined to contain multiple persons in the same groups, and outputs the group image to the person group recognizing unit 20 and the store inference unit 13 (step S22).

The person group recognizing unit 20 performs a person group recognition operation by recognizing the multiple persons in the same group from the group image extracted by the group image extraction unit 19, and by storing the group information (recognized person group ID) indicating the multiple persons recognized in the same group in the arrival store order estimation table of the database 15 (step S23).

The store inference unit 13 performs a store inference operation by identifying the possessions carried by the multiple persons of the same group from the group image extracted by the group image extraction unit 19, by inferring from the identified possessions the store from which the possessions have been obtained, and stores the store information (inferred store ID list) indicating the inferred store in the arrival store order estimation table of the database 15 (step S15).

The arrival store order determination unit 16 performs an arrival store order determination operation by determining the order of stores visited by the persons in the same group on a per group basis based on a change in a time sequence of listing of the stores from the arrival store order estimation table on the database 15, by storing the store name corresponding to the store ID of the store newly visited by the persons in the same group in the arrival store order estimation table of the database 15, by outputting the arrival store order information indicating the order of stores visited by each group together with the group information to the communication unit 17, and by transmitting the arrival store order information and the group information from the communication unit 17 to the display 3 (step S16).

The display 3 performs an arrival store order reception operation to receive the arrival store order information and the group information (step S17).

Finally, the display 3 performs a display operation to display the order of stores visited by each group from the received arrival store order information (step S18).

In accordance with the second embodiment, through the process described above, the external appearance multi-person image containing the multiple persons is captured, and it is determined from the captured external appearance multi-person image whether the multiple persons are in the same group. The group image containing multiple persons determined to be in the same group is extracted from the external appearance multi-person image. The multiple persons of the same group are recognized from the extracted group image. The possessions carried by the multiple persons of the same group are identified from the extracted group image. The stores from which the identified possessions have been obtained are inferred based on the identified possessions. The group information (recognized person group ID) indicating the multiple persons of the same group, the store information (inferred store ID list) indicating the store inferred from the possessions carried by the multiple persons of the same group, and the time information indicating the time at which the external appearance multi-person image has been captured are stored in an associated form on the database 15. The order of stores visited by the same group is determined based on a change in the time sequence of the listing of the stores indicated by the store information stored on the database 15.

In accordance with the second embodiment, the multiple persons of the same group visit multiple stores, and the person who carries the possessions obtained from each store changes from one person to another within the group. In such a case, as well, the order of stores visited by the same group is determined at a higher accuracy level with a simple configuration.

Modifications

In each of the embodiments, the same cameras 21 through 2n are used to photograph persons, and possessions. The cameras 21 through 2n are not limited to the configuration described above, and may be changed in a variety of configurations.

Figure 19:
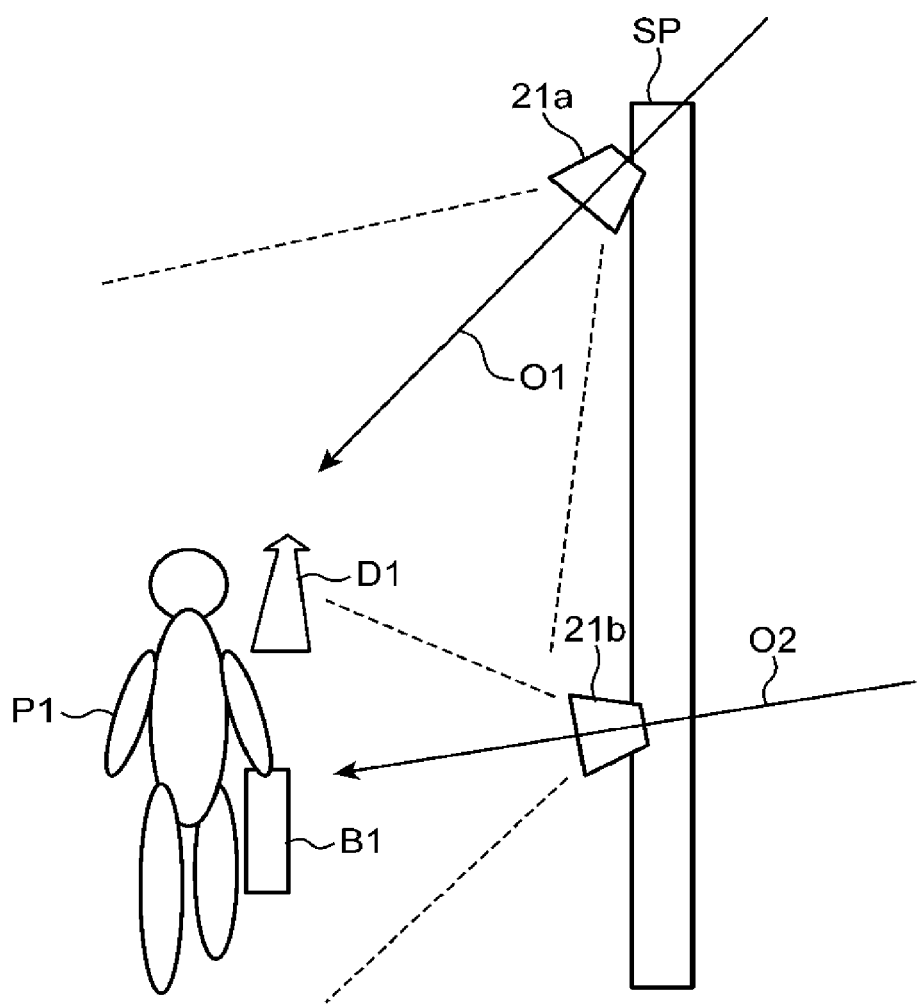
FIG. 19 illustrates a first deployment example of a camera capturing the image of a person, and a camera capturing the image of possessions.

FIG. 19 illustrates a first deployment example of a camera capturing the image of a person, and a camera capturing the image of possessions. In order to recognize persons, the image of the face of each person is to be captured at high resolution. In order to recognize the possession, such as a bag, the image of a location apart from the face is to be captured. For this reason, a camera 21a and a camera 21b are used in the first deployment example of FIG. 19 (the same is true of the cameras 22 through 2n) instead of the camera 21. The camera 21a photographs a person P1, and the camera 21b captures the external appearance image of the possession, namely, a bag B1. In this case, the image information acquisition unit 11 of FIG. 4 includes an image information acquisition unit that captures the external appearance image of the person from the camera 21a and a bag image information acquisition unit that acquires the external appearance image of the bag from the camera 21b.

The person P1 moves in a people stream line, namely, in an advance direction D1. The camera 21a is mounted on a pole SP such that an optical axis O1 of the camera 21a, namely, the shooting direction of the camera 21a intersects the advance direction D1 of the person P1 from the front side of the person P1. The camera 21a photographs the face of the person P1. The camera 21b is mounted on the pole SP and an optical axis O2 of the camera 21b, namely, the shooting direction of the camera 21b intersects perpendicularly the advance direction D1 of the person P1. The camera 21b photographs the bag B1. The imaging area of the external appearance image of the bag (an area defined by two broken lines) is closer to the ground than an image area of the external appearance image of the person P1 (an area defined by two broken lines).

By deploying the camera 21a that photographs the whole body of the person P1 and the camera 21b that photographs the bag B1, the person P1 and the bag B1 are identified at a higher accuracy level. The person P1 and the bag B1 are checked against each other by using a portion of clothes commonly photographed in the imaging area of the camera 21a and the imaging area of the camera 21b. The bag B1 carried by the person P1 is identified at a higher accuracy level.

Figure 20:
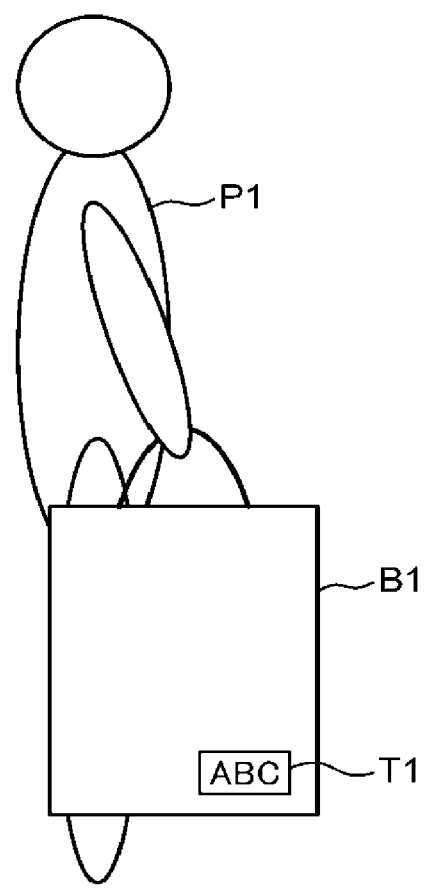
FIG. 20 is a side view of a person who carries a bag.
Figure 21:
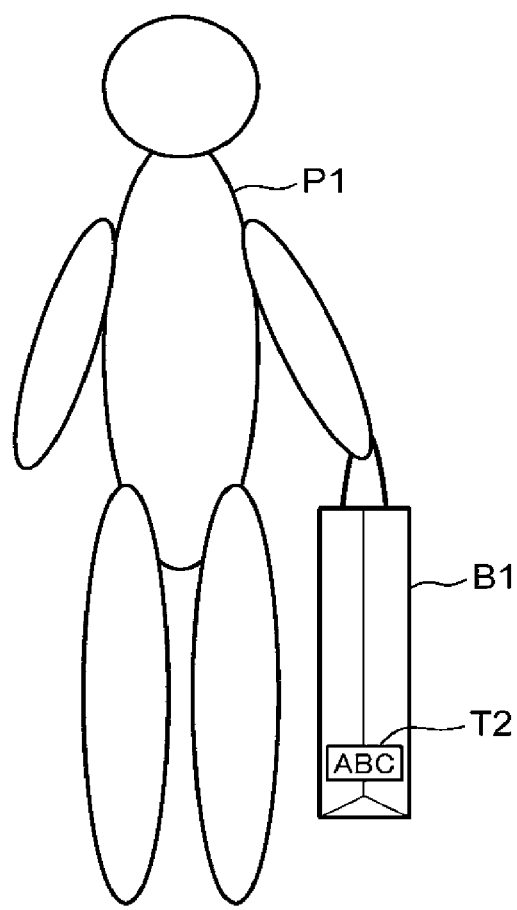
FIG. 21 is a front view of the person who carries the bag.

FIG. 20 is a side view of a person who carries a bag B1, and FIG. 21 is a front view of the person who carries the bag B1. Referring to FIG. 20 and FIG. 21, the larger surface side of the bag B1 faces typically in a direction perpendicular to the advance direction of the person P1 when the person P1 moves carrying the bag B1. A larger logo T1 formed on the larger surface side of the bag B1 (such as "ABC") illustrated in FIG. 20 also faces in a direction perpendicular to the advance direction of the person P1. A logo T2 (such as "ABC") formed on a smaller surface side surface of the bag B1 illustrated in FIG. 21 typically faces in a direction opposite from (or in the same direction as) the advance direction of the person P1. The camera photographing the face of the person P1 is deployed in a location that allows the camera to more easily photograph the person P1. The camera photographing the bag B1 is deployed at a location where the optical axis of the camera generally intersects the advance direction of the person P1 such that the larger area surface side of the bag B1 and the larger logo T1 are photographed. The camera photographing the bag B1 more easily captures the image information of the bag B1.

Figure 22:
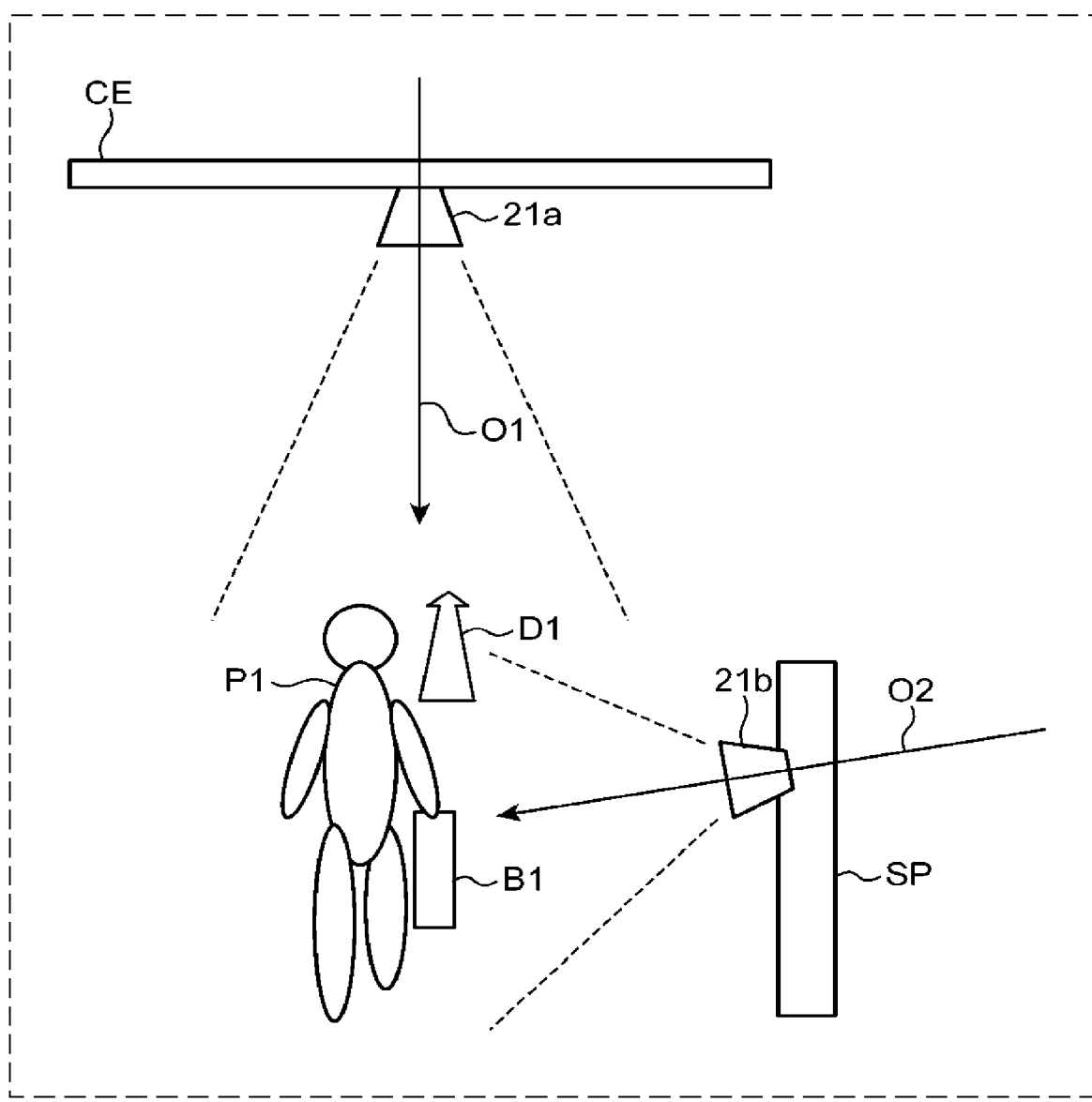
FIG. 22 diagrammatically illustrates a second deployment example of a camera capturing the image of a person, and a camera capturing the image of possessions.

In the case described below, the camera photographing the face of the person is deployed at a location where the face image of the person is easily captured, and the camera photographing the bag is deployed in a manner such that the optical axis of the camera is aligned approximately perpendicular to the advance direction of the person. FIG. 22 diagrammatically illustrates a second deployment example of a camera capturing the image of a person, and a camera capturing the image of possessions.

In the second deployment of FIG. 22, the camera 21a and the camera 21b are deployed instead of the camera 21. The camera 21a is mounted on a ceiling CE, for example, and photographs the person P1 from above. The camera 21b is mounted on the pole SP, and photographs the bag B1 from the lateral direction thereof.

The person P1 moves in a people stream line, namely, in the advance direction D1. The camera 21a is mounted on the ceiling CE such that an optical axis O1 of the camera 21a, namely, the shooting direction of the camera 21a intersects the advance direction D1 of the person P1 from above. The camera 21*b* is mounted on the pole SP and an optical axis O2 of the camera 21*b*, namely, the shooting direction of the camera 21*b* intersects perpendicularly the advance direction D1 of the person P1 from the lateral direction of the person P1.

The camera 21*a* and the camera 21*b* are deployed such that an angle made between the optical axis O1 of the camera 21*a* and the optical axis O2 of the camera 21*b* is a right angle. The external appearance image of the person P1 is an image that is captured by photographing the person P1 from above, and the external appearance image of the bag B1 is an image that is captured by photographing the bag B1 from the lateral direction thereof. The logo of the bag B1 (the larger logo T1 of FIG. 20) is recognized at a higher accuracy level. When the camera 21*a* capturing the face image is also used to capture the image of the logo of the bag B1, the logo T2 is desirably formed on the side surface of the bag B1 as illustrated in FIG. 21. In such a case, the logo is also easily recognized from the external appearance image captured by the camera 21*a* capturing the face image.

Figure 23:
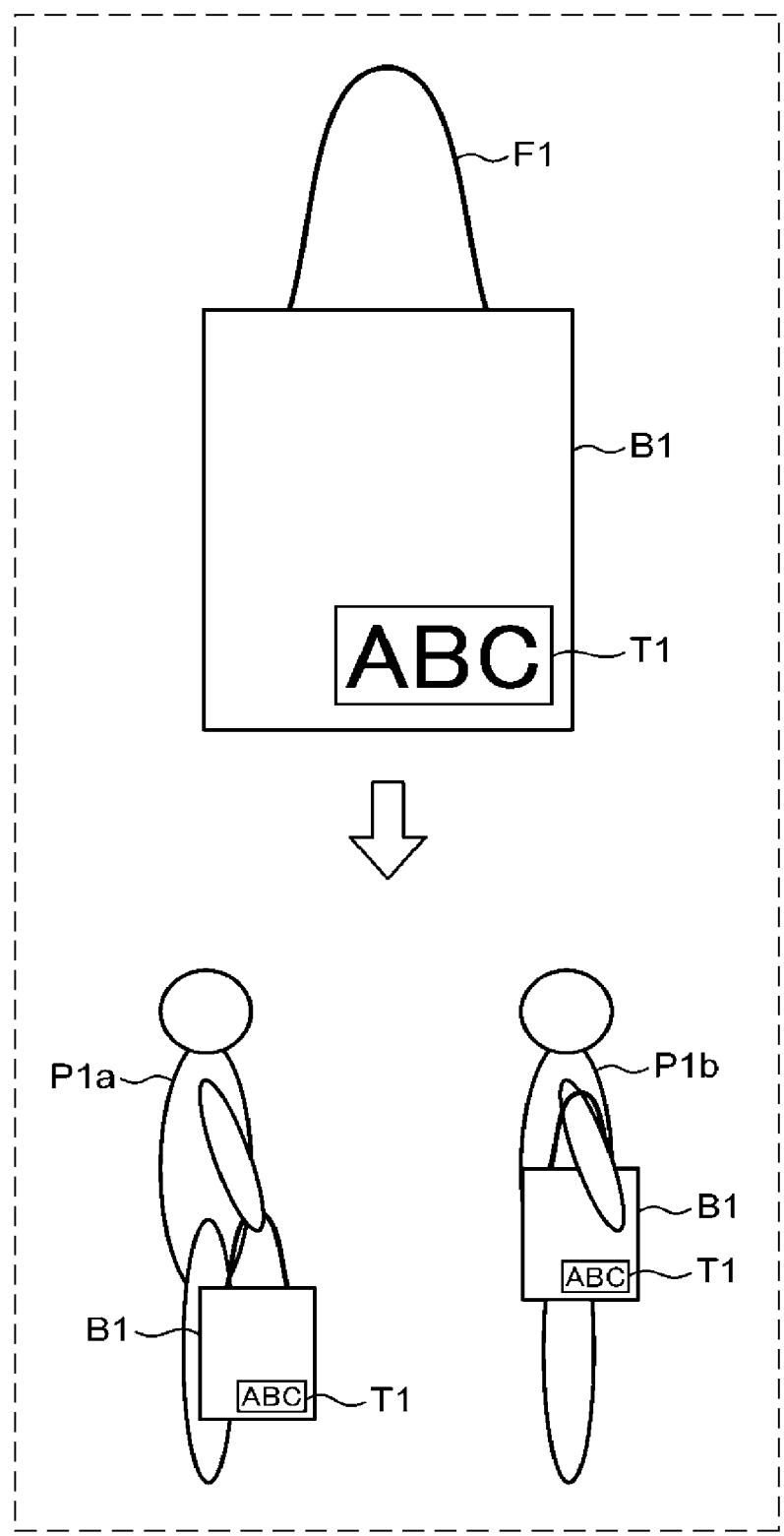
FIG. 23 diagrammatically illustrates a first example of a handle portion of the bag and how to hold the bag in the first example.
Figure 24:
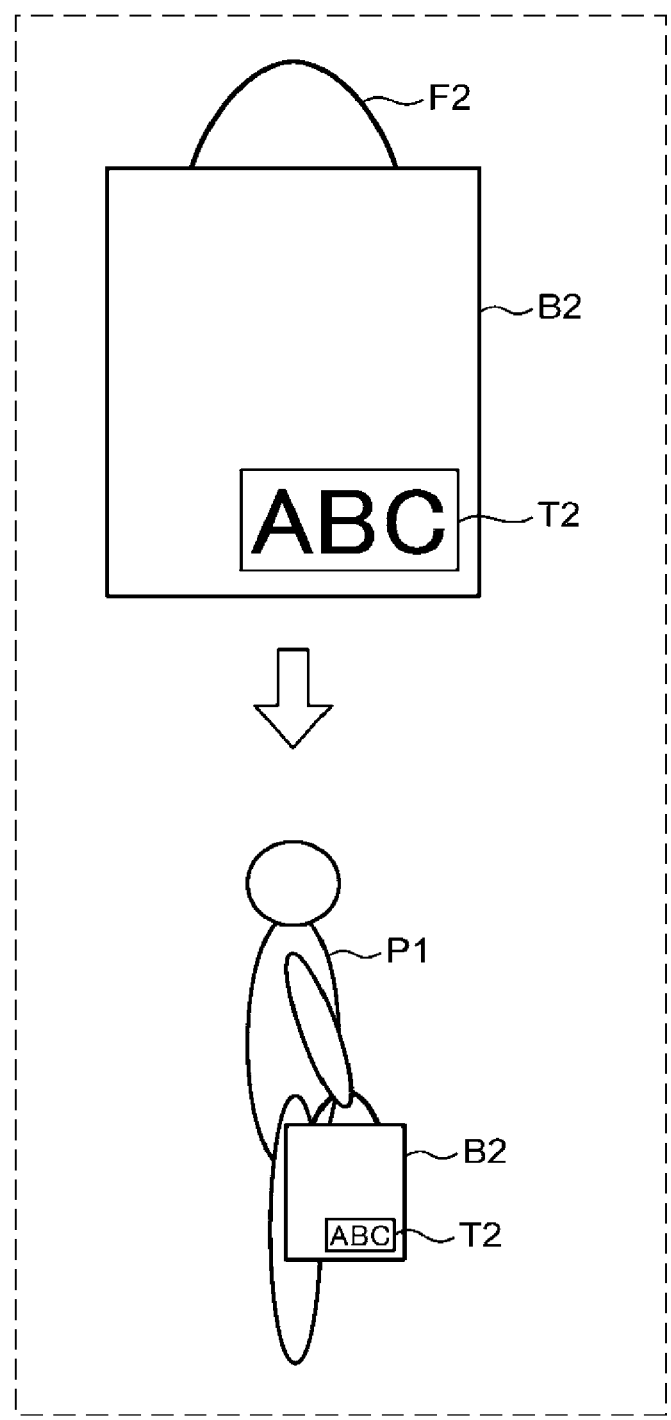
FIG. 24 diagrammatically illustrates a second example of the handle portion of the bag and how to hold the bag in the second example.
Figure 25:
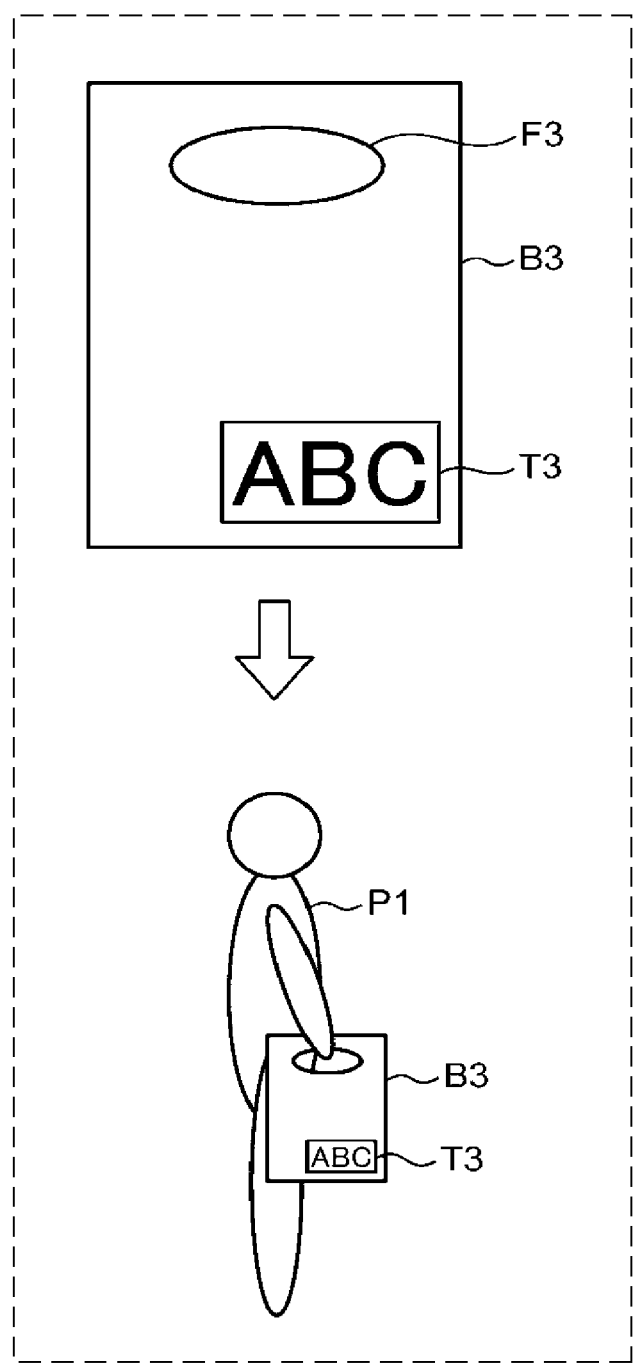
FIG. 25 diagrammatically illustrates a third example of the handle portion of the bag and how to hold the bag in the third example.

Some bags have long portions to be held, namely, handles that look like straps. FIG. 23 diagrammatically illustrates a first example of a handle portion of the bag and how to hold the bag in the first example. FIG. 24 diagrammatically illustrates a second example of the handle portion of the bag and how to hold the bag in the second example. FIG. 25 diagrammatically illustrates a third example of the handle portion of the bag and how to hold the bag in the third example;

If handles F1 of the bag B1 are larger in size than the upper arm of human, the bag B1 may be held in a hand of a person P1*a* or is shouldered by a person P1*b*. In such a case, the distance of the logo T1 of the bag B1 is largely different depending on the method. The imaging area of the camera capturing the image of the bag B1 is thus expanded. If the bag B1 is shouldered, the logo T1 of the bag B1 may be hidden by a hand, and visibility may be reduced.

A bag B2 may have handles F2 that are not be large enough to pass the upper arm therethrough as illustrated in FIG. 24. A bag B3 may have cutout areas F3 as illustrated in FIG. 25. The cutout areas F3 serving as the handles of the bag B3 may not be large enough to allow the human's upper arm to pass therethrough. If the bags B2 and B3 have a similar size, the distance of logos T2 and T3 of the bags B2 and B3 from the ground falls within a similar range.

The handles of these bags are desirably smaller in size than the upper arm of humans. If the handles of these bags are smaller in size than the upper arm of humans, the bag is not shouldered, but will be held in hand, and the distance of the logo of the bag is generally constant. As a result, the image area of the camera capturing the image of the bag is narrowed, increasing performance of recognition process.

Figure 26:
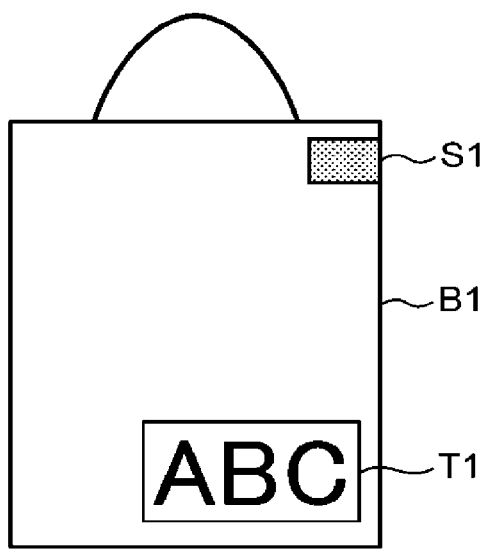
FIG. 26 illustrates a first example of a sticker glued onto the bag.
Figure 27:
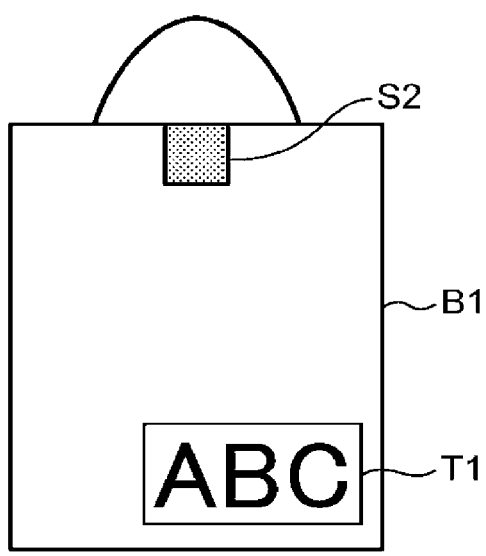
FIG. 27 illustrates a second example of the sticker glued onto the bag.

When a product is purchased, a sticker may be sometimes glued to the mouth of the bag such that the bag is not opened. FIG. 26 illustrates a first example of the sticker glued onto the bag, and FIG. 27 illustrates a second example of the sticker glued onto the bag.

Referring to FIG. 26, a sticker S1 is glued onto the upper left portion of the bag B1 having the logo T1. Referring to FIG. 27, a sticker S2 is glued onto the upper center portion of the bag B1 having the logo T1. In this way, the stickers S1 and S2 are typically glued onto the mouth of the bag B1. In this case, the stickers S1 and S2 may bear information related to the purchased product.

The sticker glued onto the bag desirably bears information related to a product purchased by a person. For example, a store clerk may glue onto a bag a sticker bearing the information related to the purchased product. The store clerk may glue different stickers for different products. In this way, in a large-scale shopping center, the information related to the type and price of a product purchased at a store is identified, and when a customer enters a different store, he or she may select one from products recommended by a store clear with reference to the product he or she has already purchased.

If the purchased price is high in price, the customer may possibly purchase a high-priced product at a new store as well. The store clerk may recommend such products in a higher price range. In a large-scale shopping mall, multiple stores cooperate such that information concerning the products purchased by customers is recognized from the appearance thereof, and sales of products are thus promoted.

The sticker may desirably have color information indicating the type and price of a product purchased by a person. FIG. 28 illustrates an example of a first color information table that indicates a correspondence relationship between types of products and colors of stickers, and FIG. 29 illustrates an example of a second color information table that indicates the correspondence relationship between prices of products and densities of colors of stickers.

Referring to FIG. 28, the first color information table that indicates the correspondence relationship between the types of products and colors of stickers is pre-stored on the database 15. For example, the type of the product "Outer" and color "red" of the sticker are stored in association with each other. Referring to FIG. 29, the second color information table that indicates the correspondence relationship between prices of products and densities of colors of stickers is pre-stored on the database 15. For example, the price of the product "1 cent-$9" and density "10%" of the color of the sticker are stored in association with each other. For example, if the type of the purchased product is "Outer", and the price thereof is $8, a sticker having a red color density of 10% is glued onto the bag.

By associating the color and density of the sticker with the type and price of the product, the information concerning the purchased product is learned from the appearance. On the other hand, there is a concern about the privacy of each customer. The correspondence relationship of the first and second color information tables of FIG. 28 and FIG. 29 may thus be changed depending on the day of the week. In such a case, only store clerks may share information about purchased products.

Figure 30:
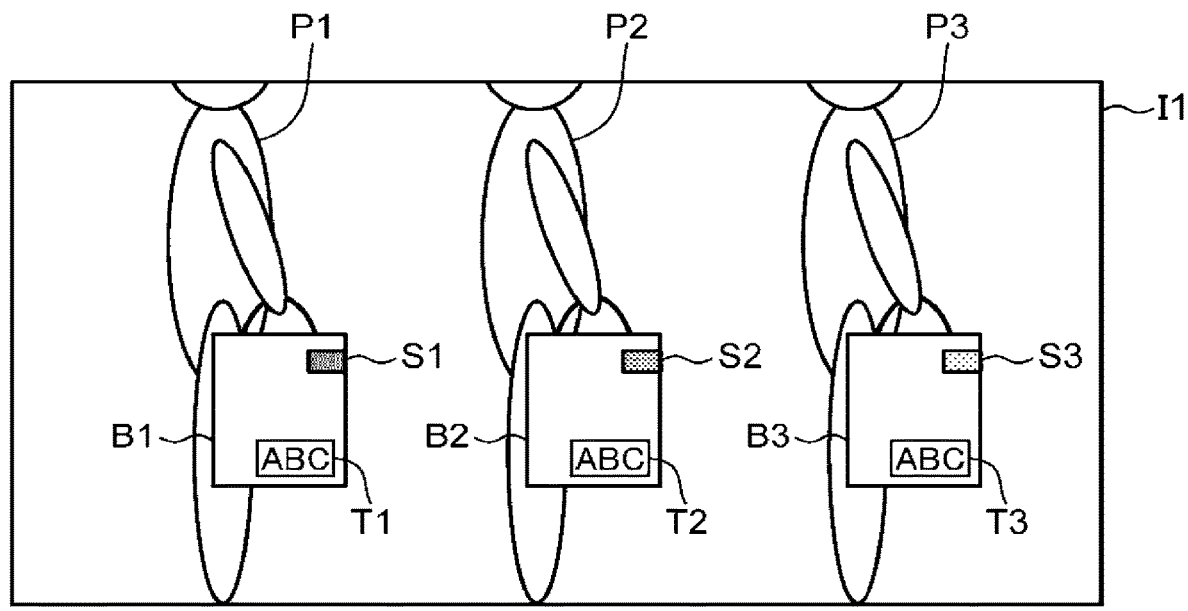
FIG. 30 illustrates an example of an external appearance image from a camera that captures the external appearance image of the bag of FIG. 19.

FIG. 30 illustrates an example of an external appearance image from a camera 21*b* that captures the external appearance image of the bag of FIG. 19. For example, a person P1 may carry a bag B1 having a logo T1 and a sticker S1, a person P2 may carry a bag B2 having a logo T2 and a sticker S2, and a person P3 carries a bag B3 having a logo T3 and a sticker S3. The camera 21*b* captures the external appearance image illustrated in FIG. 30. The color and density of each of stickers S1 through S3 are different depending on the type and price of the purchased product. The type and price of the product may be identified by the color and density of each of the stickers S1 through S3. The people stream analysis apparatus 1 acquires the color information of the color and density of the stickers S1 through S3 by acquiring the external appearance image of the bag captured by the camera 21*b*, and identifies the type and price of the product, and associates the purchaser with information concerning the destination of the purchaser.

Figure 31:
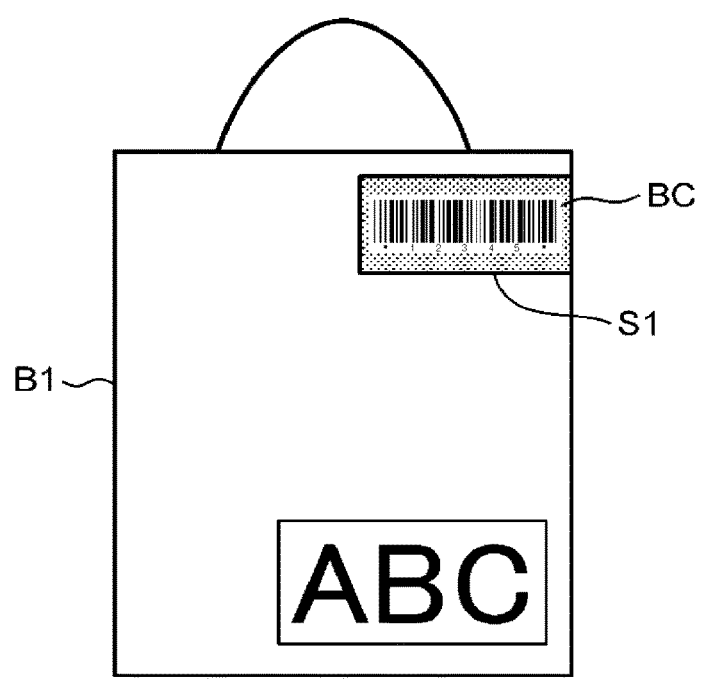
FIG. 31 illustrates an example of the sticker bearing a barcode.

Information added to the sticker is not limited to the information described above. Another piece of information may be added. FIG. 31 illustrates an example of the sticker bearing a barcode. Referring to FIG. 31, a barcode BC may be printed on the sticker S1 on the bag B1. In such a case, more detailed information may be added to the information of the barcode BC.

In accordance with the embodiments, the elements may be implemented by using dedicated hardware or by executing a software program appropriate for each element. Each element may be implemented by a program executing unit, such as a central processing unit (CPU) or a processor, which reads and executes the software program stored on a recording medium, such as a hard disk or a semiconductor memory.

In accordance with the embodiments of the present disclosure, some or all of the functional blocks may be typically implemented using a large scale integration (LSI) as an integrated circuit. The functional blocks may be individually implemented into chips. Some or all functional blocks may be implemented using a single chip. Integration is not limited to LSI, and may be performed using a dedicated circuit or a general-purpose processor. A field programmable gate array (FPGA) that is programmable after the manufacture of LSI or a reconfigurable processor that is reconfigurable in configuration and setting of circuit cells inside the LSI may also be used.

Some or all of the functionalities of the embodiments of the disclosure may be implemented by a processor, such as a CPU, which executes the program.

The people stream analysis method, the people stream analysis apparatus, and the people stream analysis system of the embodiments of the disclosure may determine the visit order of stores by a person at a higher accuracy level in a simple configuration find applications in a people stream analysis system performing a people stream analysis method analyzing the stream of people, and including a people stream analysis apparatus.

What is claimed:

1. An apparatus for estimating a purchased product, the apparatus comprising:
    a processor; and
    a storage that stores a program which causes the processor to execute
        acquiring an external appearance image of a person taken by a first camera,
        recognizing the person from the external appearance image,
        identifying from the external appearance image a possession carried by the person, and inferring from the identified possession a bag to which a sticker is attached, wherein the sticker has product information concerning a type or price of a product purchased by the person at a store from which the bag is obtained,
        storing, in an associated form in a memory, person information indicating the recognized person, the product information.

2. The apparatus according to claim 1,
    wherein the program further causes the processor to executes
        acquiring an external appearance image of the bag taken by a second camera,
    wherein an image region of the second camera is closer to the ground than an image region of the first camera.

3. The apparatus according to claim 1,
    wherein the program further causes the processor to execute:
        acquiring an external appearance image of the bag taken by a second camera; and
        inferring from the external appearance image of the bag the store from which the bag has been obtained,
    wherein the product information further includes store information indicating the inferred store.

4. The apparatus according to claim 1,
    wherein the program further causes the processor to execute:
        acquiring an external appearance image of the bag taken by a second camera; and
        checking the person and the bag against each other by using clothes of the person commonly taken in the image regions of the first camera and the second camera.

5. The apparatus according to claim 1,
    wherein the program further causes the processor to executes
        acquiring an external appearance image of the bag taken by a second camera,
    wherein the first camera is set such that a shooting direction of the first camera perpendicularly intersects an advance direction of the person from above, and
    wherein the second camera is set such that a shooting direction of the second camera perpendicularly intersects the advance direction of a person from a lateral direction.

6. The apparatus according to claim 1, wherein a handle portion of the bag is smaller in size than an upper arm of a human.

7. The apparatus according to claim 1, wherein the sticker has color information, as the product information, indicating the type or the price of the product purchased by the person.

8. The apparatus according to claim 1, wherein the sticker has barcode information, as the product information, indicating the type or the price of the product purchased by the person.

* * * * *